(12) United States Patent
Kondou et al.

(10) Patent No.: US 9,157,422 B2
(45) Date of Patent: Oct. 13, 2015

(54) RECIPROCATING PUMP AND OXYGEN CONCENTRATOR

(75) Inventors: Keita Kondou, Settsu (JP); Tetsuya Ukon, Settsu (JP); Munehiro Okamura, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/346,271

(22) PCT Filed: Sep. 7, 2012

(86) PCT No.: PCT/JP2012/072906
§ 371 (c)(1),
(2), (4) Date: Mar. 20, 2014

(87) PCT Pub. No.: WO2013/042557
PCT Pub. Date: Mar. 28, 2013

(65) Prior Publication Data
US 2014/0216262 A1  Aug. 7, 2014

(30) Foreign Application Priority Data
Sep. 21, 2011  (JP) ................................ 2011-205671

(51) Int. Cl.
*B01D 53/047* (2006.01)
*F04B 1/04* (2006.01)
(Continued)

(52) U.S. Cl.
CPC ............ *F04B 1/0421* (2013.01); *B01D 53/047* (2013.01); *C01B 13/0259* (2013.01); *F04B 27/02* (2013.01); *F04B 27/0404* (2013.01); *F04B 27/053* (2013.01);
(Continued)

(58) Field of Classification Search
CPC . B01D 53/047; C01B 13/0259; F04B 1/0421; F04B 27/02; F04B 27/0404; F04B 39/064; F04B 39/121; F04B 39/123
See application file for complete search history.

(56) References Cited

U.S. PATENT DOCUMENTS

2010/0319547 A1   12/2010 Kondou et al.

FOREIGN PATENT DOCUMENTS

| EP | 2 123 911 A1 | 11/2009 |
|---|---|---|
| JP | 2006-233863 A | 9/2006 |

(Continued)

OTHER PUBLICATIONS

International Search Report of corresponding PCT Application No. PCT/JP2012/072906.
(Continued)

*Primary Examiner* — Christopher P Jones
(74) *Attorney, Agent, or Firm* — Global IP Counselors

(57) ABSTRACT

A reciprocating pump includes a motor having a motor shaft, four cylinders, four pistons disposed in the cylinders and reciprocated by the motor shaft, a casing accommodating the motor shaft, and eight ducts. The four cylinders are disposed at positions offset 90 degrees from each other about the motor shaft. Cylinder shaft directions are perpendicular to a motor shaft direction. The eight ducts include four intake ducts and four exhaust ducts. Gas is introduced into the cylinders through the intake ducts and discharged from the cylinders through the exhaust ducts. The eight ducts are disposed in a region surrounded by the cylinders when viewed along the motor shaft direction. The eight ducts are arranged in four pairs with each pair disposed between adjacent cylinders about the motor shaft. The four pairs of ducts disposed between the adjacent cylinders extend along the motor shaft direction.

12 Claims, 23 Drawing Sheets

(51) Int. Cl.
*C01B 13/02* (2006.01)
*F04B 27/04* (2006.01)
*F04B 27/02* (2006.01)
*F04B 39/06* (2006.01)
*F04B 39/12* (2006.01)
*F04B 27/053* (2006.01)

(52) U.S. Cl.
CPC ............ *F04B 39/064* (2013.01); *F04B 39/121* (2013.01); *F04B 39/123* (2013.01)

(56) References Cited

FOREIGN PATENT DOCUMENTS

| | | |
|---|---|---|
| JP | 2009-30462 A | 2/2009 |
| JP | 2009-185789 A | 8/2009 |

OTHER PUBLICATIONS

International Preliminary Report of corresponding PCT Application No. PCT/JP2012/072906.
European Search Report of corresponding EP Application No. 12 83 3208.7 dated Jun. 3, 2015.

RECIPROCATING PUMP AND OXYGEN CONCENTRATOR

CROSS-REFERENCE TO RELATED APPLICATIONS

This U.S. National stage application claims priority under 35 U.S.C. §119(a) to Japanese Patent Application No. 2011-205671, filed in Japan on Sep. 21, 2011, the entire contents of which are hereby incorporated herein by reference.

TECHNICAL FIELD

The present invention relates to a reciprocating pump including a plurality of cylinders and an oxygen concentrator in which the reciprocating pump is used.

BACKGROUND ART

Traditionally, a reciprocating pump including a plurality of cylinders is used in an oxygen concentrator or the like.

For example, Japanese Patent Laid-open Publication No. 2006-233863 discloses a reciprocating pump including two compressing cylinders disposed to face each other with a motor shaft interposed therebetween. A cylinder head communicating with a cylinder chamber is attached to each of end portions of the two compressing cylinders, and an intake duct through which air is introduced to the cylinder chamber and an exhaust duct through which the compressed air is discharged from the cylinder chamber are connected to the cylinder head. The intake duct and the exhaust duct are pipe fittings separate from the reciprocating pump, and are disposed outside the pump.

In a traditional pump including four cylinders, similarly to the pump of PTL 1, the intake duct and exhaust duct that communicate with the cylinder chamber pump are the pipe fittings separate from the pump, and disposed outside the pump.

SUMMARY

Technical Problem

However, disposing the intake pipe fitting and the exhaust pipe fitting outside the pump as described above causes an increase in the size of the pump. In the pump including the four cylinders in particular, there are eight pipe fittings. Due to this, it is difficult to compactly install the pump, and therefore the size of the pump is further increased.

An object of the present invention is to provide a reciprocating pump in which an increase in the size of the pump is restrained.

Solutions to the Problems

In order to solve this objects, a reciprocating pump according to a first aspect of the present invention includes: a motor including a motor shaft; four cylinders that are disposed at positions that are offset 90 degrees from each other about the motor shaft, cylinder shaft directions of the cylinders being perpendicular to a motor shaft direction; four pistons disposed in the cylinders, respectively, which are configured to be reciprocated by the motor shaft; a casing that accommodates therein the motor shaft; and eight ducts including four intake ducts through which gas is introduced to the four cylinders and four exhaust ducts through which gas is discharged from the four cylinders, which are disposed in a region surrounded by the four cylinders when viewed in the motor shaft direction. In the reciprocating pump, each two of the eight ducts are disposed between the cylinders adjacent to each other about the motor shaft, and the two ducts disposed between the cylinders adjacent to each other about the motor shaft are arrayed in the motor shaft direction.

In the reciprocating pump, the eight ducts are disposed in the region surrounded by the four cylinders. It is therefore possible to restrain enlargement of the reciprocating pump as compared with a case where the ducts are disposed outside the region. Each two of the eight ducts are disposed between the cylinders adjacent to each other about the motor shaft. The space surrounded by the four cylinders therefore is effectively used for efficiently arranging the ducts. The two ducts disposed between the cylinders adjacent to each other are arrayed in the motor shaft direction. It is therefore possible to compactly arrange the two ducts when viewed in the motor shaft direction. The term "the two ducts are arrayed in the motor shaft direction" includes a case where the two ducts do not overlap each other when viewed in the motor shaft direction.

According to a second aspect, in the reciprocating pump of the first aspect, each of the eight ducts includes a first duct that extends onto a side of the motor shaft from an outside of the region surrounded by the four cylinders when viewed in the motor shaft direction, and each of at least four ducts of the eight ducts includes a second duct extending in the motor shaft direction.

In the reciprocating pump, the second duct is formed along the motor shaft direction. The second duct is therefore efficiently arranged and enlargement is more reliably restrained.

According to a third aspect, in the reciprocating pump of the second aspect, the first duct and the second duct are formed in the casing.

In the reciprocating pump, the first duct and the second duct are formed in the casing. The first duct and the second duct are therefore efficiently arranged as compared with the case that a member such as a pipe is used as the first duct or the second duct, and the enlargement can more securely be restrained.

According to a fourth aspect, the reciprocating pump of the second and third aspects further includes an integrated duct disposed in the region surrounded by the four cylinders when viewed in the motor shaft direction, the integrated duct integrating the plurality of ducts communicating with the plurality of cylinders.

In the reciprocating pump, the plural ducts are integrated in the region surrounded by the four cylinders when viewed in the motor shaft direction. The ducts are therefore efficiently integrated.

According to a fifth aspect, in the reciprocating pump of the fourth aspect, the two integrated ducts are arrayed in the motor shaft direction.

In the reciprocating pump, the two integrated ducts are arrayed in the motor shaft direction. It is therefore possible to compactly arrange the plural integrated ducts.

According to a sixth aspect, in the reciprocating pump of the fourth and fifth aspects, the integrated duct is formed into an annular shape concentric with the motor shaft.

In the reciprocating pump, even if the integrated duct is disposed near the motor shaft, it is possible to keep the integrated duct from interfering the motor shaft.

According to a seventh aspect, in the reciprocating pump of the first to sixth aspects, at least one cylinder out of the four cylinders is used in compression, and the remaining cylinders are used in decompression.

With this, the reciprocating pump has the functions of both the compressing pump and the decompressing pump.

According to an eighth aspect, in the reciprocating pump of the first to sixth aspects, all the four cylinders are used in compression or decompression, and two or three cylinders out of the four cylinders are equal to one another in a pressure level, and are different from the remaining cylinder in the pressure level.

The reciprocating pump has the function of two kinds of compressing pumps that discharge the compressed air with different pressures, or the function of two kinds of decompressing pumps having different suction forces. The term "the two cylinders are equal to each other in the pressure level" means that the two cylinders are equal to each other in the maximum pressure in the cylinder chamber in cases where the two cylinders are used in the compression, and means that the two cylinders are equal to each other in the minimum pressure in the cylinder chamber in cases where the two cylinders are used in the decompression.

According to a ninth aspect, in the reciprocating pump of the first to eighth aspects, the two cylinders are used in the compression or the decompression at the same pressure level, and the two pistons disposed in the two cylinders are reciprocated in phases that are offset 180 degrees from each other.

In the reciprocating pump, the two pistons disposed in the two cylinders at the same pressure level are reciprocated in the phases that are offset 180 degrees from each other, so that times when maximum loads are applied to the two pistons, namely, times when load torque of the motor shaft is increased are made different from each other in a balanced manner. Therefore, it is possible to restrain a load change of the motor shaft.

According to an eleventh aspect, in the reciprocating pump of the first to ninth aspects, the two cylinders disposed to oppose each other are used in the compression or the decompression at the same pressure level.

In the reciprocating pump, the two cylinders at the same pressure level are disposed to oppose each other with the motor shaft interposed therebetween. Therefore, forces applied to the motor shaft from the two pistons disposed in the two cylinders in the direction perpendicular to the motor shaft have the same magnitude and the directions opposite to each other. This enables application of the force to the motor shaft in a balanced manner. As a result, a torque change is restrained, and efficiency improvement and vibration restraint are possible.

According to an eleventh aspect, in the reciprocating pump of the first to tenth aspects, the first duct of the exhaust duct connected to the decompressing cylinder communicates with an inside of the casing.

In the reciprocating pump, it is possible to use the gas discharged from the decompressing cylinder to cool the motor shaft and the like. Therefore, there is no need for separately providing a cooling device.

According to a twelfth aspect, in the reciprocating pump of the first to eleventh aspects, the two second ducts communicating with the two cylinders disposed in positions offset 90 degrees from each other are connected to each other while arrayed in the motor shaft direction.

In the reciprocating pump, the two ducts are integrated by connecting the two second ducts arrayed in the motor shaft direction. Therefore, a simple structure enables integration of the two ducts.

An oxygen concentrator according to a thirteenth aspect of the present invention includes: an adsorption unit in which an adsorbent is enclosed, the adsorbent adsorbing and desorbing nitrogen according to a pressure, the adsorption unit generating an oxygen concentrated gas by adsorbing the nitrogen in supplied air to the adsorbent; and pump configured to perform at least one of supply of compressed air to the adsorption unit and decompression in the adsorption unit. In the oxygen concentrator, the pump is the reciprocating pump of any one of claims 1 to 12.

With the pump that restrains the enlargement in the oxygen concentrator, enlargement of the oxygen concentrator is restrained.

Effects of the Invention

As described above, the following effects are obtained in the present invention.

According to the first aspect of the present invention, the eight ducts are disposed in the region surrounded by the four cylinders. It is therefore possible to restrain enlargement of the reciprocating pump as compared with a case where the ducts are disposed outside the region. Further, each two of the eight ducts are disposed between the cylinders adjacent to each other about the motor shaft. The space surrounded by the four cylinders therefore is effectively used for efficiently arranging the ducts. Additionally, the two ducts disposed between the cylinders adjacent to each other are arrayed in the motor shaft direction. It is therefore possible to compactly arrange the two ducts when viewed in the motor shaft direction.

According to the second aspect of the present invention, the second duct is formed along the motor shaft direction. The second duct is therefore efficiently arranged and enlargement is more reliably restrained.

According to the third aspect of the present invention, the first duct and the second duct are formed in the casing. The first duct and the second duct are therefore efficiently arranged as compared with the case that a member such as a pipe is used as the first duct or the second duct, and the enlargement can more securely be restrained.

According to the fourth aspect of the present invention, the plural ducts are integrated in the region surrounded by the four cylinders when viewed in the motor shaft direction. The ducts are therefore efficiently integrated.

According to the fifth aspect of the present invention, because the two integrated ducts are arrayed in the motor shaft direction, it is possible to compactly arrange the plural integrated ducts.

According to the sixth aspect of the present invention, even if the integrated duct is disposed near the motor shaft, it is possible to keep the integrated duct from interfering the motor shaft.

According to the seventh aspect of the present invention, the reciprocating pump has the functions of both the compressing pump and the decompressing pump.

According to the eighth aspect of the present invention, it is possible for the reciprocating pump to act as the two kinds of compressing pumps that discharge the compressed air with the different pressures, or act as the two kinds of decompressing pumps having the different suction forces.

According to the ninth aspect of the present invention, because the two pistons disposed in the two cylinders at the same pressure level are reciprocated in the phases that are offset 180 degrees from each other, it is possible to differentiate, in a balanced manner, the times when the maximum loads applied to the two pistons, namely, the times when the load torque of the motor shaft is increased. Therefore, it is possible to restrain a load change of the motor shaft.

According to the tenth aspect of the present invention, the two cylinders at the same pressure level are disposed to oppose each other with the motor shaft interposed therebetween. Therefore, forces applied to the motor shaft from the two pistons disposed in the two cylinders in the direction perpendicular to the motor shaft have the same magnitude and the directions opposite to each other. This enables application of the force to the motor shaft in a balanced manner. As a result, a torque change is restrained, and efficiency improvement and vibration restraint are possible.

According to the eleventh aspect of the present invention, it is possible to use the gas discharged from the decompressing cylinder to cool the motor shaft and the like. Therefore, there is no need for separately providing a cooling device.

According to the twelfth aspect of the present invention, the two second ducts arrayed in the motor shaft direction are connected to each other to integrate the two ducts. Therefore, a simple structure enables integration of the two ducts.

According to the thirteenth aspect of the present invention, enlargement of the oxygen concentrator is restrained with the use of the pump in which the enlargement is restrained.

DESCRIPTION OF EMBODIMENTS

The following describes an oxygen concentrator of an embodiment according to the present invention. An oxygen concentrator 1 of the embodiment is an oxygen concentrator adopting an adsorption system which adsorbs nitrogen in air to an adsorbent to generate an oxygen concentrated gas, and is an oxygen concentrator adopting Vacuum Pressure Swing Adsorption (VPSA) system. In the oxygen concentrator adopting the VPSA system, compressed air is supplied to an adsorption vessel during a nitrogen adsorption process, and an adsorption vessel is set to a negative pressure to desorb the nitrogen from the adsorbent during a nitrogen desorption process.

Figure 1:
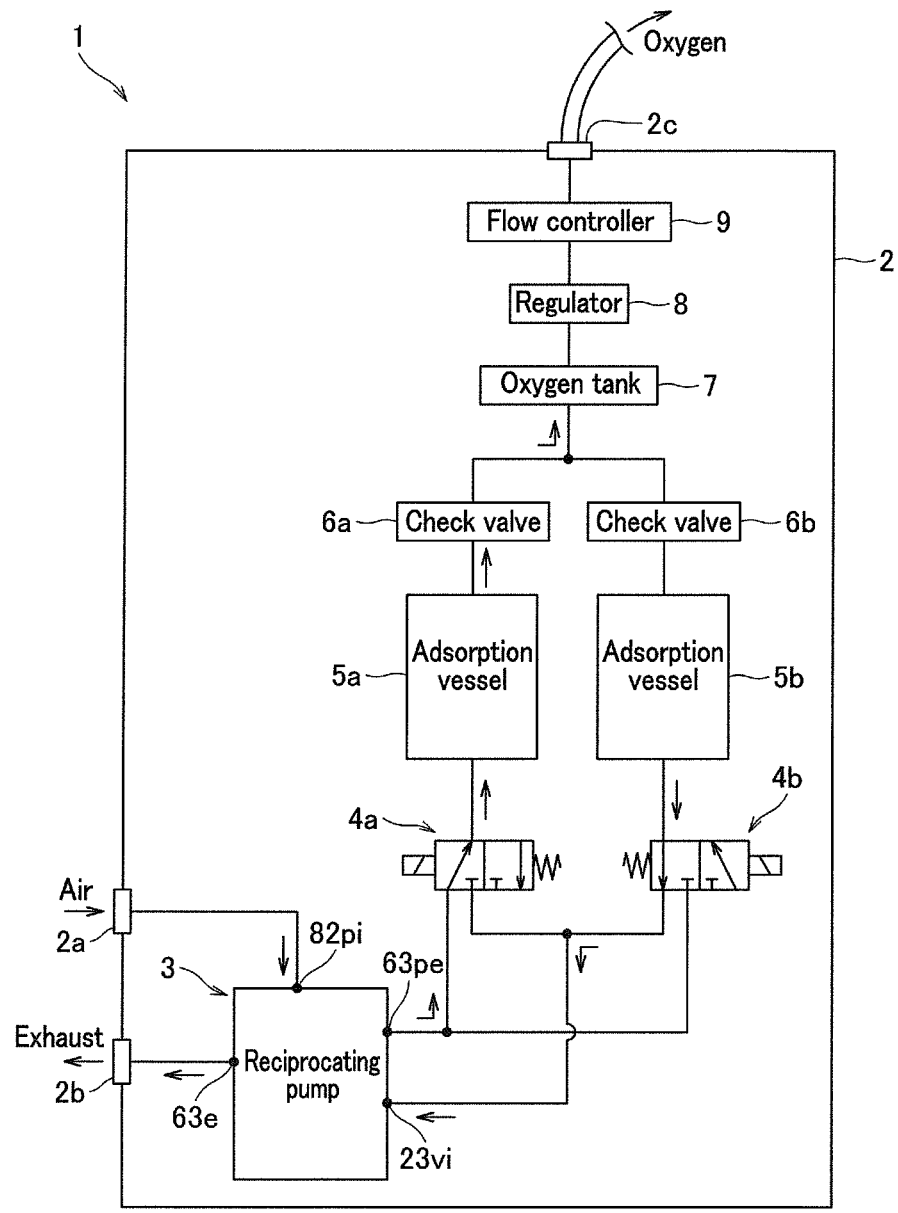
FIG. 1 shows an oxygen concentrator according to an embodiment of the present invention.

As shown in FIG. 1, the oxygen concentrator 1 includes a reciprocating pump 3, two directional control valves 4a and 4b, two adsorption vessels (adsorption unit) 5a and 5b, two check valves 6a and 6b, an oxygen tank 7, a regulator 8, a flow controller 9, a control unit (not shown), a casing 2 accommodating these units therein, and an operation unit (not shown) provided in the casing 2. An air inlet port 2a, an exhaust port 2b, and an oxygen outlet port 2c are formed in the casing 2. A tube is connected to the oxygen outlet port 2c in order to supply oxygen to a user.

Although described in detail later, the reciprocating pump 3 performs both compression and decompression, and the reciprocating pump 3 supplies the compressed air to one of the adsorption vessels 5a and 5b while sucking and decompressing a nitrogen containing gas (hereinafter simply referred to as air) in the other one of the adsorption vessels 5a and 5b. The reciprocating pump 3 performs internal cooling using the air sucked by the decompressing pump. In the reciprocating pump 3 are provided a compressing intake port 82pi, a compressing exhaust port 63pe, a decompressing intake port 23vi, and a cooling exhaust port 63e.

The air outside the casing 2 flows in the casing 2 through the air inlet port 2a, flows in the reciprocating pump 3 through the compressing intake port 82pi, and is compressed by the reciprocating pump 3. The compressed air is discharged to the outside of the reciprocating pump 3 through the compressing exhaust port 63pe, and supplied to the adsorption vessels 5a and 5b through the directional control valves 4a and 4b. The air in the adsorption vessels 5a and 5b is sucked into the reciprocating pump 3 through the directional control valves 4a and 4b and the decompressing intake port 23vi. The sucked air cools the inside of the reciprocating pump 3, discharged through the cooling exhaust port 63e, and finally discharged to the outside of the casing 2 through the exhaust port 2b.

The adsorption vessels 5a and 5b are alternately communicated with the compressing exhaust port 63pe and the decompressing intake port 23vi of the reciprocating pump 3 by the directional control valves 4a and 4b. Adsorbents such as zeolite, which adsorb the nitrogen under high pressure and desorb the adsorbed nitrogen under low pressure, are enclosed in the adsorption vessels 5a and 5b.

FIG. 1 shows the state in which the adsorption vessel 5a communicates with the compressing exhaust port 63pe while the adsorption vessel 5b communicates with the decompressing intake port 23vi. In this case, the compressed air is supplied to the adsorption vessel 5a, and the nitrogen in the compressed air is adsorbed by the adsorbent, thereby generating the oxygen concentrated gas. On the other hand, the air in the adsorption vessel 5b is sucked, and the adsorption vessel 5b becomes the negative pressure to desorb the nitrogen adsorbed to the adsorbent, thereby discharging the nitrogen from the adsorption vessel 5b. Although not shown, when switch positions of the directional control valves 4a and 4b are opposite to those shown in FIG. 1, the oxygen concentrated gas is generated in the adsorption vessel 5b, and the nitrogen is desorbed from the adsorbent the adsorption vessel 5a and discharged from the adsorption vessel 5a. Repeating the above process continuously and stably generates the oxygen concentrated gas.

The oxygen concentrated gases generated by the adsorption vessels 5a and 5b are fed to the oxygen tank 7 through the check valves 6a and 6b which prevent a backflow. The oxygen tank 7 temporarily reserves the oxygen concentrated gas. The oxygen concentrated gas in the oxygen tank 7 is discharged from the oxygen outlet port 2c through the regulator 8 configured to adjust a pressure of the oxygen concentrated gas and the flow controller 9 configured to adjust a flow rate of the oxygen concentrated gas, and is supplied to the user.

The reciprocating pump 3 will be described below with reference to FIG. 2 to FIG. 19. The reciprocating pump 3 of the embodiment includes a motor 10, a casing 20, two compressing cylinders 30Ap and 30Bp, two decompressing cylinders 30Cv and 30Dv, four cylinder heads 40, four pistons 50, a first casing head 60, a partition plate 70, and a second casing head 80. In the following description, a vertical direction in FIG. 2, FIG. 3, and FIG. 5 to FIG. 10 is defined as a vertical direction. Hereinafter, sometimes the compressing cylinders 30Ap and 30Bp and the decompressing cylinders 30Cv and 30Dv are simply referred to as a cylinder 30.

(Motor)

Figure 7:
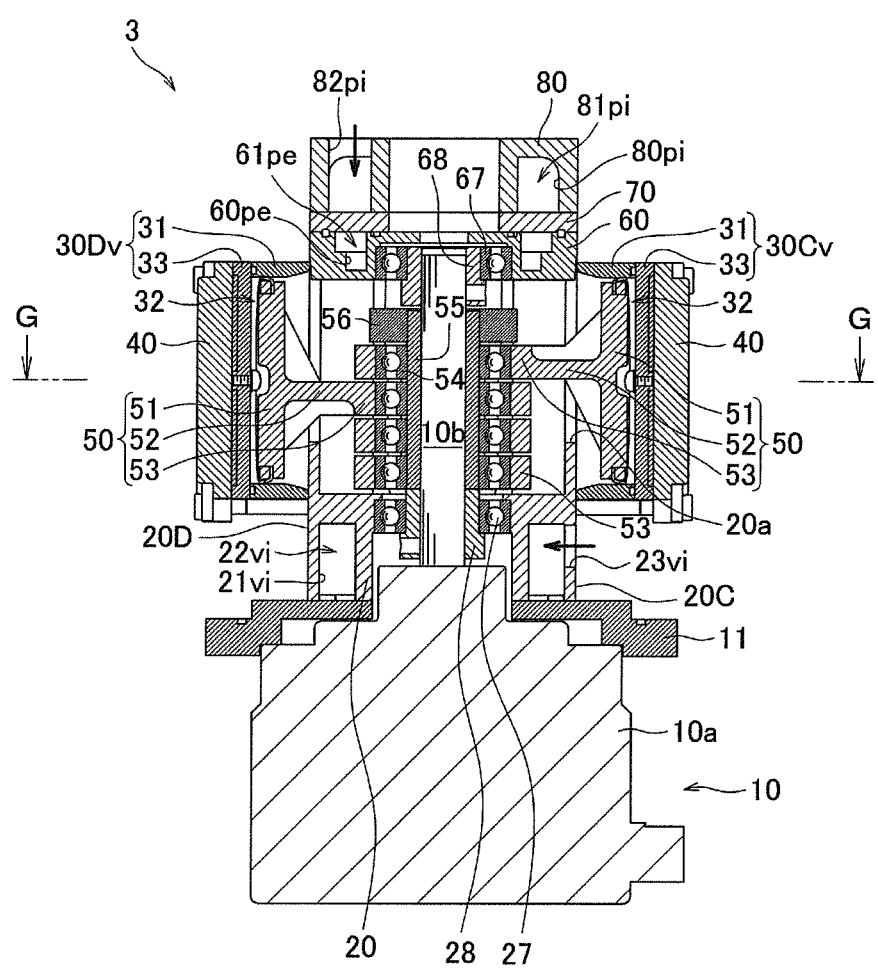
FIG. 7 is a cross sectional view taken along a line C-C in FIG. 6.

As shown in FIG. 7 and the like, the motor 10 includes a motor body 10a and a motor shaft 10b extending upward from the motor body 10a. To an upper surface of the motor body 10a is attached an annular plate 11.

(Casing)

Figure 3:
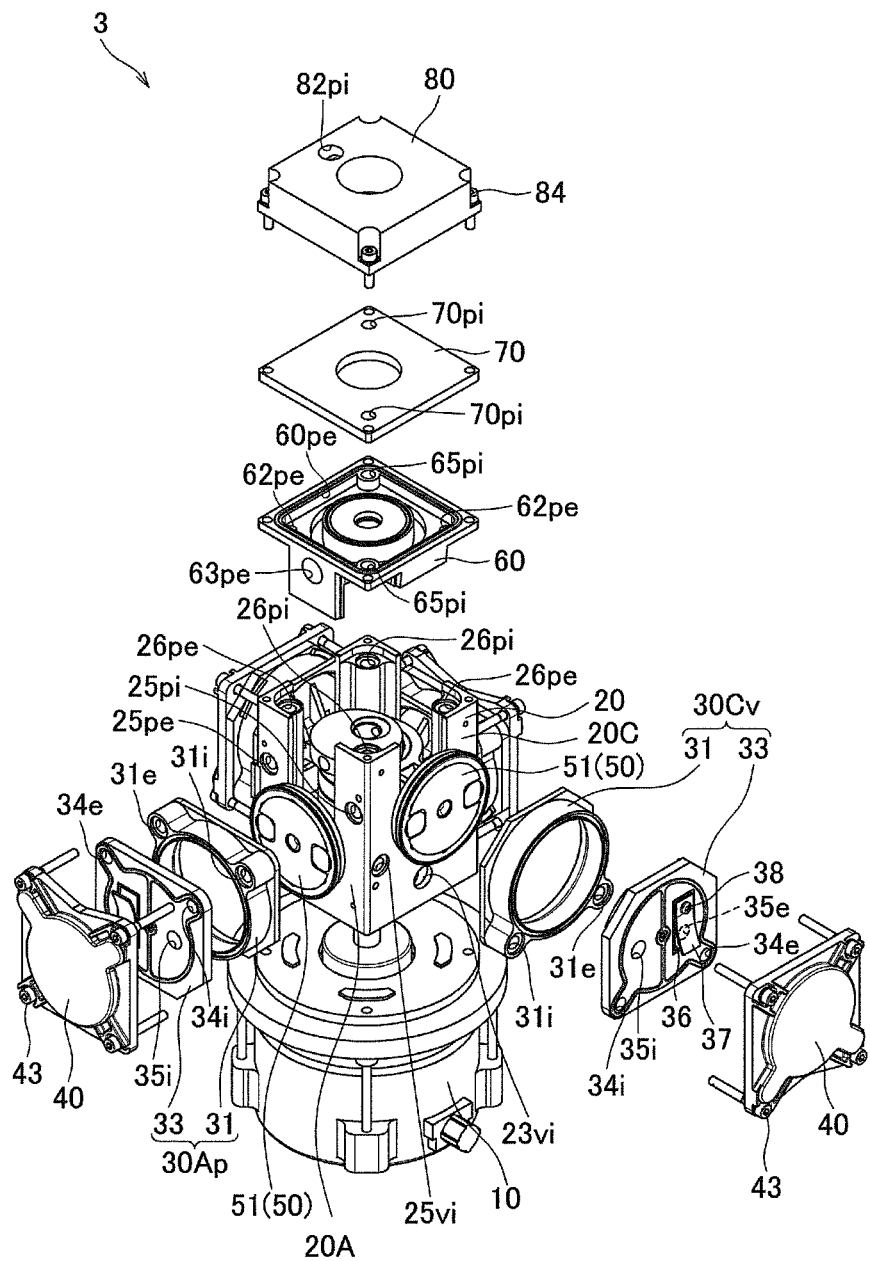
FIG. 3 is an exploded perspective view of the reciprocating pump.
Figure 4:
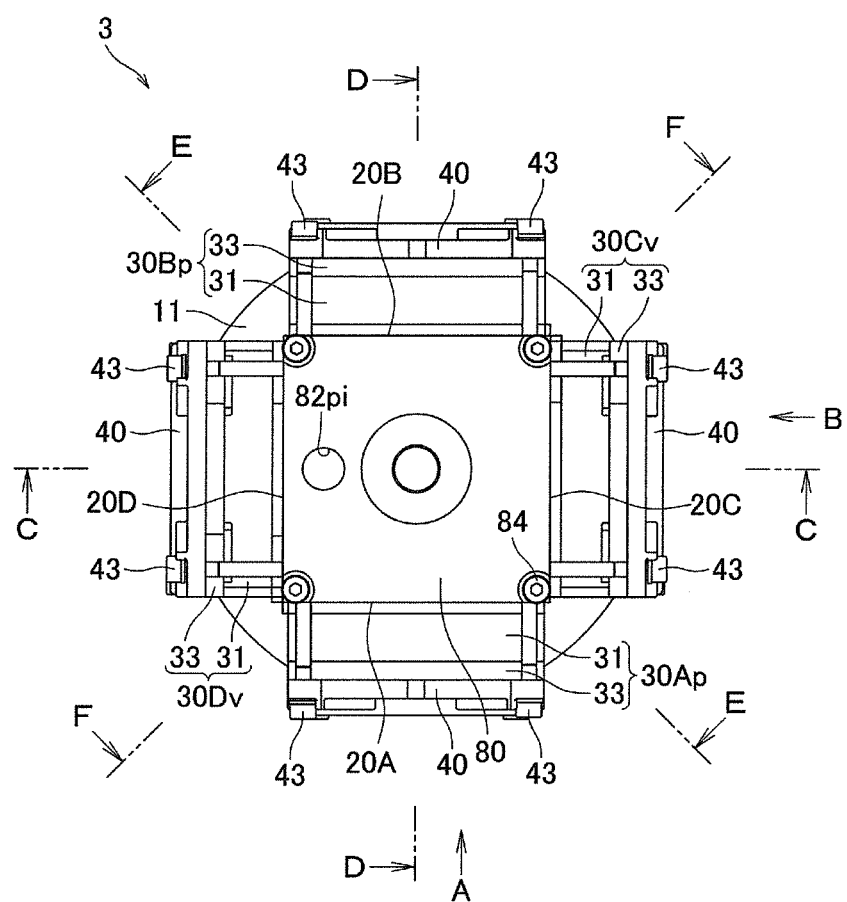
FIG. 4 is a plan view of the reciprocating pump.

As shown in FIG. 7 and the like, the casing 20 is placed on the upper surface of the annular plate 11, and accommodates therein the motor shaft 10b. As shown in FIG. 3 and FIG. 14, the casing 20 is a tubular member that has a substantially square shape extending in the vertical direction. A bearing 27 is fitted in an inner circumferential surface of a lower side of the casing 20, and the casing 20 rotatably supports the motor shaft 10b while the bearing 27 and a tubular shaft 28 are interposed therebetween.

Figure 5:
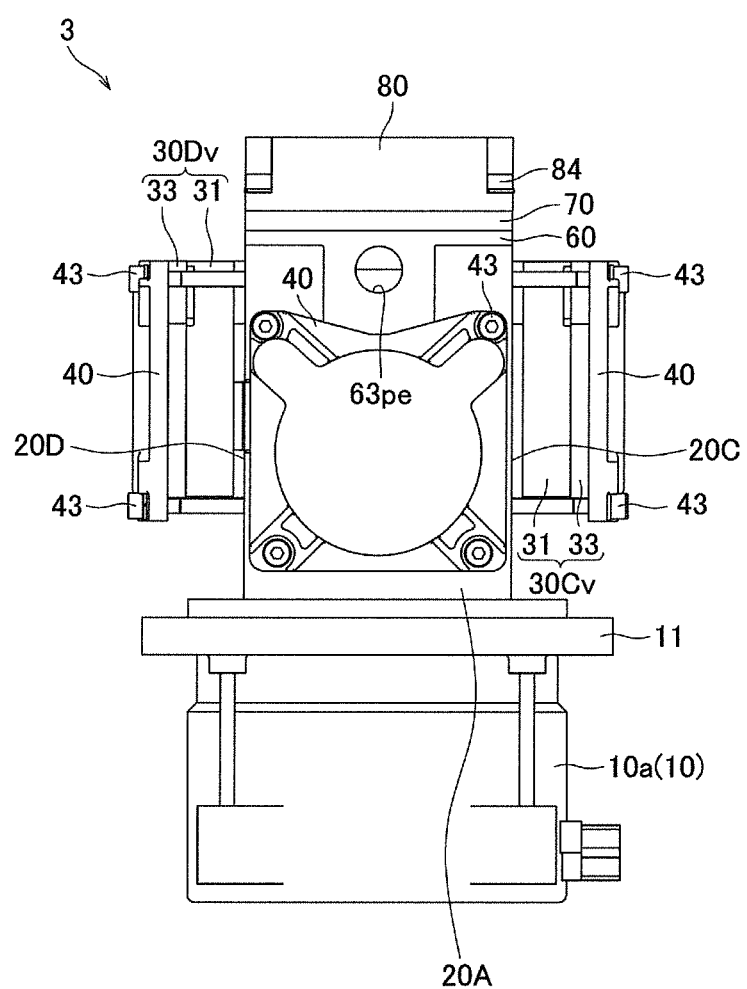
FIG. 5 shows the reciprocating pump viewed from an arrow A in FIG. 4.
Figure 6:
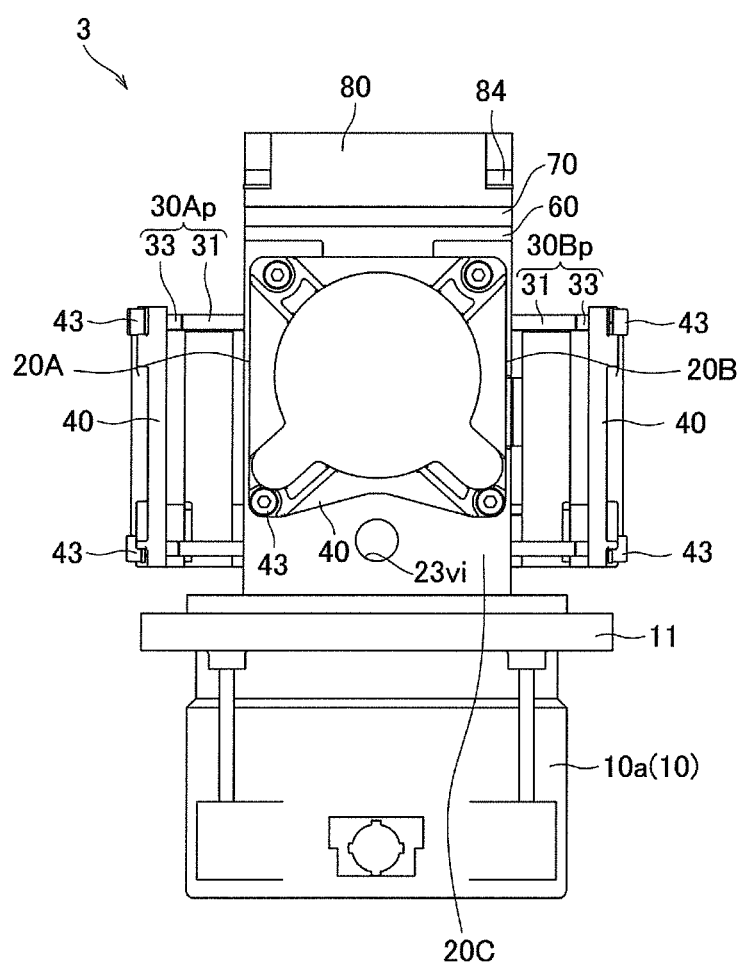
FIG. 6 shows the reciprocating pump viewed from an arrow B in FIG. 4.

As shown in FIG. 14 and the like, a notch 20a is formed in each of four sidewalls 20A to 20D of the casing 20, and has a U-shape in a side view. As shown in FIG. 5 and FIG. 6, the compressing cylinders 30Ap and 30Bp are disposed outside the sidewalls 20A and 20B of the casing 20 opposing each other, and the decompressing cylinders 30Cv and 30Dv are disposed outside the sidewall 20C and 20D of the casing 20 opposing each other. The four cylinders 30 are disposed such that a cylinder shaft direction of each cylinder is perpendicular to the motor shaft 10b. As shown in FIG. 14(b) and FIG. 14(d), a recess 20b is formed at substantially the middle portion relative to the vertical direction at each of two corners of the casing 20. In each recess 20b is inserted a projection 31b formed in each of the two cylinders 30 which are adjacent to each other over the recess 20b. The recess 20b and the projection 31b are for positioning the cylinder 30 with respect to the casing 20.

Figure 14A:
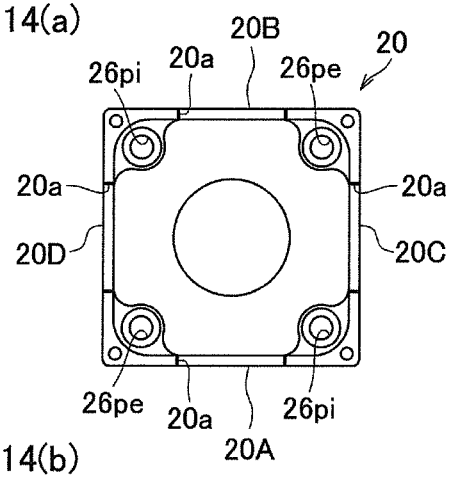
FIG. 14(a) is a plan view of a casing.
Figure 14B:
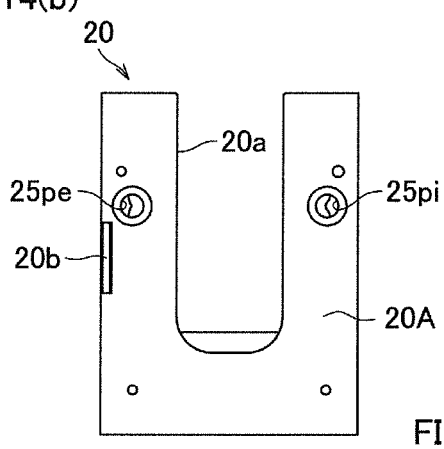
FIGS. 14(b) and 14(d) are side views of the casing.
Figure 14C:
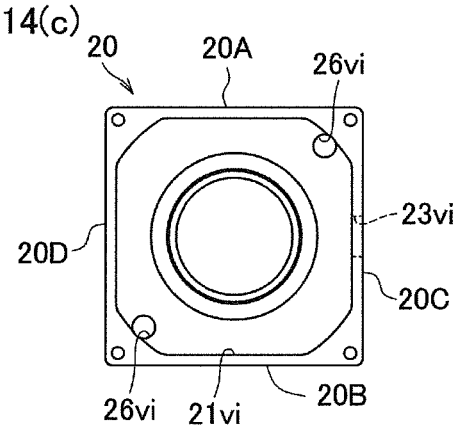
FIG. 14(c) is a rear view of the casing.
Figure 14D:
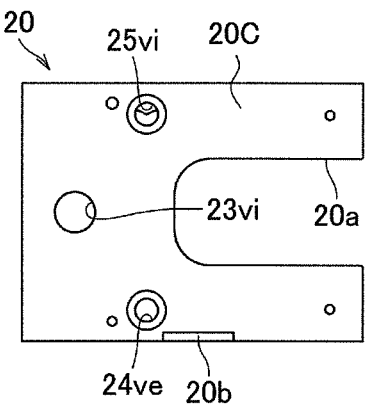

As shown in FIG. 7 and FIG. 14(c) and the like, an annular groove 21vi is formed in a lower surface of the casing 20. The annular groove 21vi and the annular plate 11 constitute a decompressing integrated intake duct 22vi. As shown in FIG. 7 and FIG. 14, the decompressing intake port 23vi communicating the annular groove 21vi is formed on the sidewall of the casing 20.

Figure 19:
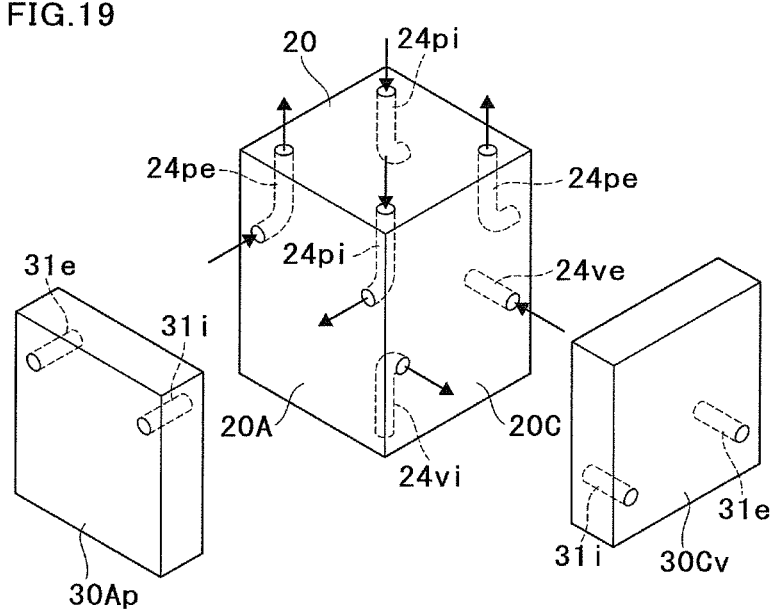
FIG. 19 is a schematic perspective view showing a duct of the reciprocating pump.

As shown in FIG. 19, the casing 20 includes eight ducts; i.e., two ducts 24pi, two ducts 24pe, two ducts 24vi, and two ducts 24ve. The ducts 24pi are configured to introduce the air to the compressing cylinders 30Ap and 30Bp. The ducts 24pe are configured to discharge the air from the compressing cylinders 30Ap and 30Bp. The ducts 24vi are configured to introduce the air to the decompressing cylinders 30Cv and 30Dv. The ducts 24ve are configured to discharge the air from the decompressing cylinders 30Cv and 30Dv. The duct 24pi includes a compressing intake duct (first duct) 25pi and a compressing intake duct (second duct) 26pi. The duct 24pe includes a compressing exhaust duct (first duct) 25pe and a compressing exhaust duct (second duct) 26pe, and the duct 24vi includes a decompressing intake duct (first duct) 25vi and a decompressing intake duct (second duct) 26vi. The duct 24ve includes only the first duct of the present invention.

Figure 12:
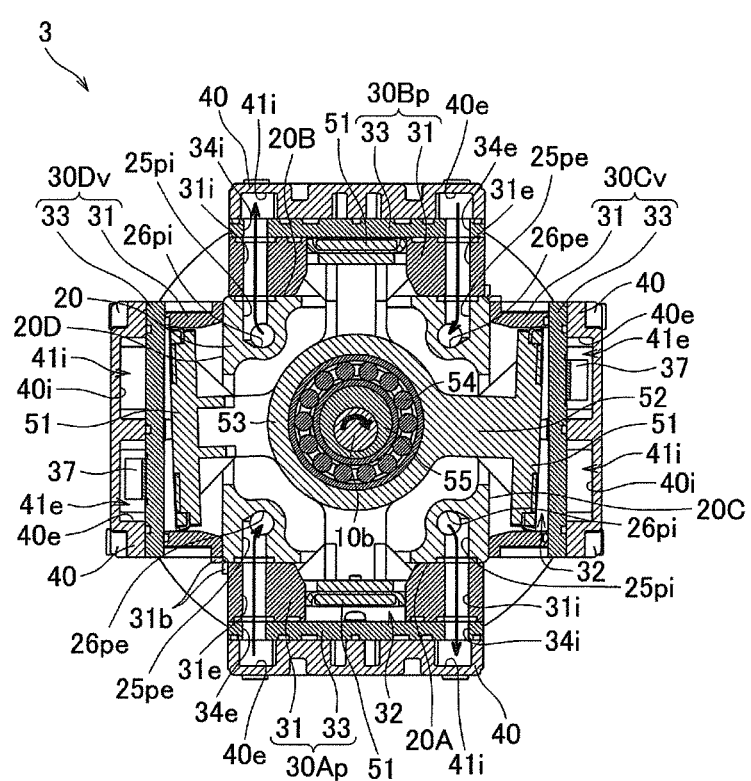
FIG. 12 is a cross sectional view taken along a line H-H in FIGS. 9 and 10.

As shown in FIG. 3 and FIG. 14, the compressing intake duct (first duct) 25pi and the compressing exhaust duct (first duct) 25pe are formed on the sidewall 20A, and the compressing intake duct 25pi and the compressing exhaust duct 25pe are also formed on the sidewall 20B. As shown in FIG. 12, the two compressing intake ducts 25pi and the two compressing exhaust ducts 25pe extend in the cylinder shaft directions (the vertical direction in FIG. 12) of the compressing cylinders 30Ap and 30Bp. An end portion of the compressing intake duct 25pi is connected to the compressing intake duct (second duct) 26pi, and an end portion of the compressing exhaust duct 25pe is connected to the compressing exhaust duct (second duct) 26pe.

Figure 13:
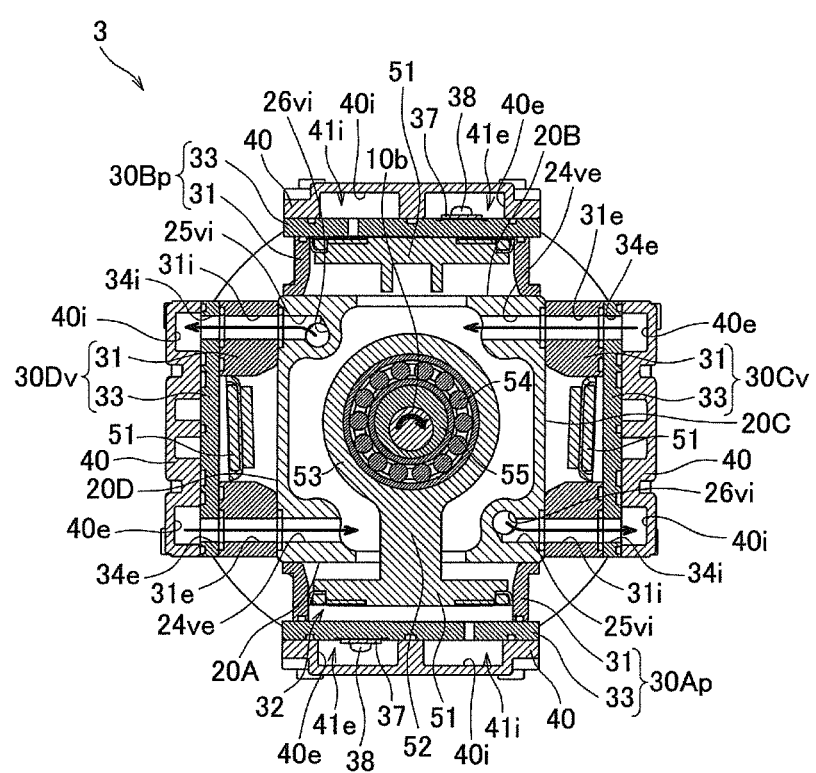
FIG. 13 is a cross sectional view taken along a line I-I in FIG. 9 and FIG. 10.

As shown in FIG. 3 and FIG. 14, the decompressing intake duct (first duct) 25vi and the decompressing exhaust duct (first duct) 24ve are formed on the sidewall 20C, and the decompressing intake duct 25vi and the decompressing exhaust duct 24ve are also formed on the sidewall 20D. As shown in FIG. 13, the two decompressing intake ducts 25vi and the two decompressing exhaust ducts 24ve extend in the cylinder shaft directions (the horizontal direction in FIG. 13) of the decompressing cylinders 30Cv and 30Dv. The end portion of the decompressing intake duct 25vi is connected to the decompressing intake duct 26vi. The decompressing exhaust duct 24ve pierces the casing 20.

Figure 9:
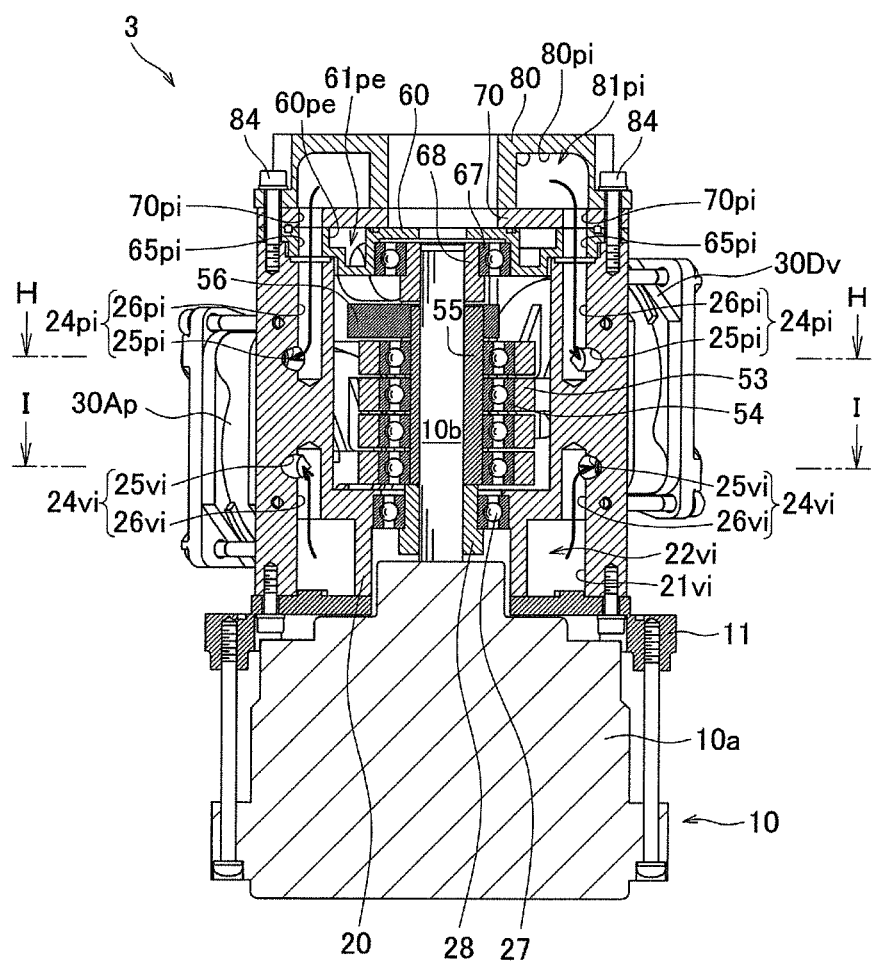
FIG. 9 is a cross sectional view taken along a line E-E in FIG. 6.

As shown in FIG. 9, the compressing intake ducts (second duct) 26pi are vertically formed in substantially upper half regions of the corner portions on a diagonal line (see a line E-E in FIG. 4) of the casing 20, respectively. To the lower side of the compressing intake duct 26pi is connected the compressing intake duct (first duct) 25pi. Further, below the compressing intake ducts 26pi are formed the decompressing intake ducts (second duct) 26vi in the vertical direction. A lower end of the decompressing intake duct 26vi is connected to the annular groove 21vi.

Figure 10:
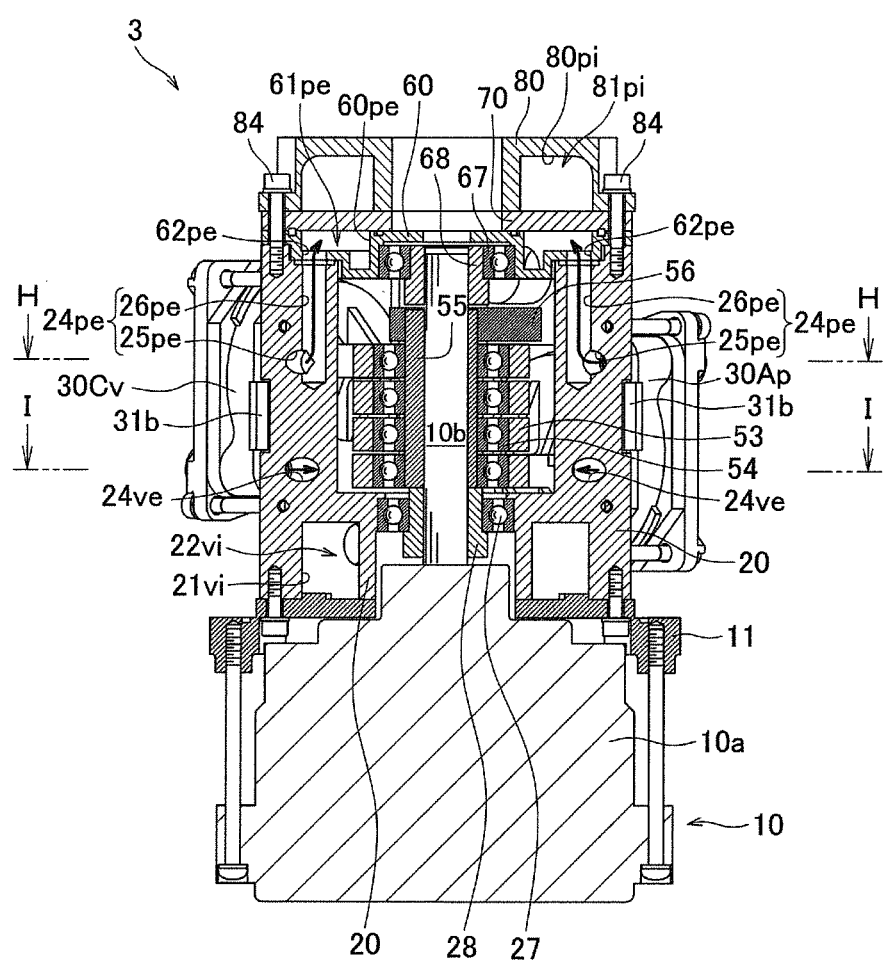
FIG. 10 is a cross sectional view taken along a line F-F in FIG. 6.

As shown in FIG. 10, the compressing exhaust ducts (the second duct) 26pe are vertically formed in the substantially upper half regions of the corner portions on the diagonal line (see a line F-F in FIG. 4) of the casing 20, respectively. To the lower side of the compressing exhaust duct 26*pe* is connected the compressing exhaust duct (the first duct) 25*pe*. Further, below the two compressing exhaust ducts 26*pe* are formed the two decompressing exhaust ducts 24*ve* in the vertical direction respectively.

Accordingly, as shown in FIG. 19, the two ducts 24*pi* are disposed along with the two ducts 24*vi*, and the two ducts 24*pe* are vertically disposed along with the two ducts 24*ve*.

(Cylinder)

As described above, the four cylinders 30 are disposed outside the four sidewalls of the casing 20, namely, at positions that are offset 90 degrees from each other about the motor shaft 10*b*. The cylinder 30 is fixed and sandwiched between the cylinder head 40 and the casing 20. As shown in FIG. 6 and the like, the compressing cylinders 30Ap and 30Bp opposed to each other are disposed at the same level. As shown in FIG. 5, the decompressing cylinders 30Cv and 30Dv opposed to each other are disposed at the same level, but are disposed at a level higher than the compressing cylinders 30Cv and 30Dv. The compressing cylinder and the decompressing cylinder have the same structure except for being upside down to each other (reversed).

Figure 11:
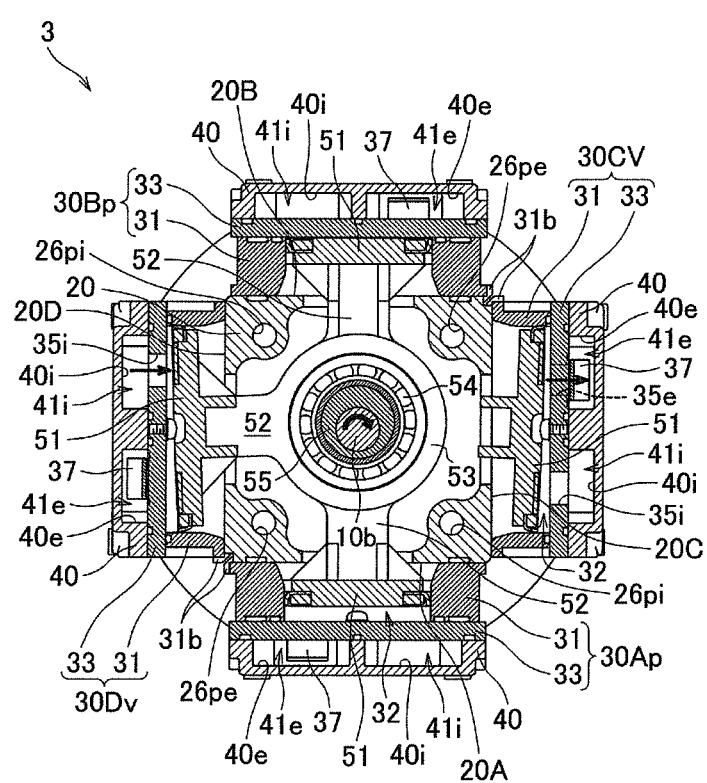
FIG. 11 is a cross sectional view taken along a line G-G in FIG. 7.

As shown in FIG. 3 and the like, the cylinder 30 is constructed with a cylinder tube 31 and a bottom member 33. The cylinder tube 31 extends in the direction perpendicular to the motor shaft 10*b*. As shown in FIG. 11 and the like, an inner circumferential surface of the cylinder tube 31 and the bottom member 33 constitute a cylinder chamber 32. As shown in FIG. 11, the projection 31*b* to be inserted in the recess 20*b* is formed in the end portion of the cylinder tube 31 on the side of the casing 20.

As shown in FIG. 3, an intake duct 31*i* and an exhaust duct 31*e* are formed in an outer circumferential portion of the cylinder tube 31. The intake duct 31*i* is connected to the intake duct (the compressing intake duct 25*pi* or the decompressing intake duct 25*vi*) formed in the casing 20. The exhaust duct 31*e* is connected to the exhaust duct (the compressing exhaust duct 25*pe* or the decompressing exhaust duct 24*ve*) formed in the casing 20.

The bottom member 33 is attached to one end of the cylinder tube 31. As shown in FIG. 3, an intake port 35*i* and an exhaust port 35*e* are formed in a region of the bottom member 33, which region corresponds to radially inside of the cylinder tube 31 when viewed from a tubular axis direction of the cylinder tube 31. As shown in FIG. 3, FIG. 12, and FIG. 13, two communication holes 34*i* and 34*e* are made in the bottom member 33 so as to be connected to the intake duct 31*i* and the exhaust duct 31*e* of the cylinder tube 31.

As shown in FIG. 3, an exhaust valve 36 that opens and closes the exhaust port 35*e* and a valve presser 37 that controls an opening degree of the exhaust valve 36 are attached to a surface opposite to the cylinder tube 31 of the bottom member 33 by a bolt 38. Normally the exhaust valve 36 is in a closed state in which the exhaust valve 36 is in close contact with the exhaust port 35*e*. When a pressure in the cylinder chamber 32 surpasses the pressure outside (an exhaust chamber 41*e*) the cylinder chamber 32, a leading end portion of the exhaust valve 36 is lifted by the air in the cylinder chamber 32 and becomes an opened state (while a maximum bending angle is restricted by the valve presser 37).

Although not shown, an intake valve that opens and closes the intake port 35*i* is attached to the surface of the bottom member 33 on the side of the cylinder tube 31 by a bolt. Normally the intake valve is in the closed state in which the intake valve is in close contact with the intake port 35*i*. When the pressure in the cylinder chamber 32 becomes lower than the pressure outside (an intake chamber 41*i*) the cylinder chamber 32, the leading end portion of the intake valve is drawn in the cylinder chamber 32 to become the opened state.

(Cylinder Head)

Figure 15:
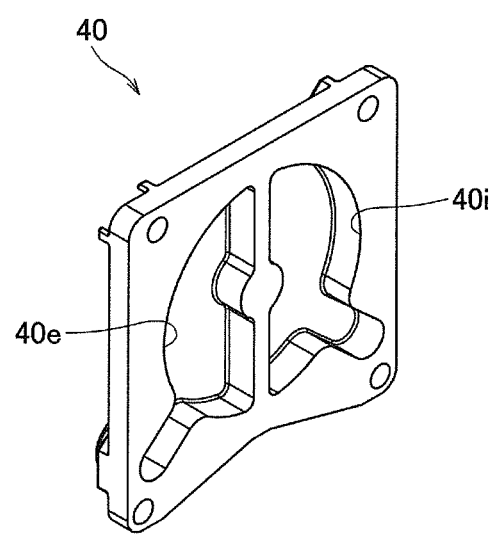
FIG. 15 is a perspective view of a cylinder head.

The four cylinder heads 40 are attached to the bottom members 33 of the four cylinders 30. The cylinder heads 40 are each fixed to the casing 20 by four bolts 43. As shown in FIG. 3, FIG. 15, and the like, an intake groove 40*i* and an exhaust groove 40*e* are formed on the surface of the cylinder head 40 on the side of the cylinder 30. The intake groove 40*i* and the exhaust groove 40*e* have a substantially semi-circular shape when viewed in the tubular axis direction of the cylinder tube 31. When viewed in the tubular axis direction of the cylinder tube 31, the intake groove 40*i* is formed in the region including the communication hole 34*i* and the intake port 35*i* of the bottom member 33. When viewed in the tubular axis direction of the cylinder tube 31, the exhaust groove 40*e* is formed in the region including the communication hole 34*e* and the exhaust port 35*e* of the bottom member 33. As shown in FIG. 11 and the like, the intake groove 40*i* and the bottom member 33 of the cylinder 30 constitute the intake chamber 41*i*, and the exhaust groove 40*e* and the bottom member 33 of the cylinder 30 constitute the exhaust chamber 41*e*.

(Piston)

Figure 8:
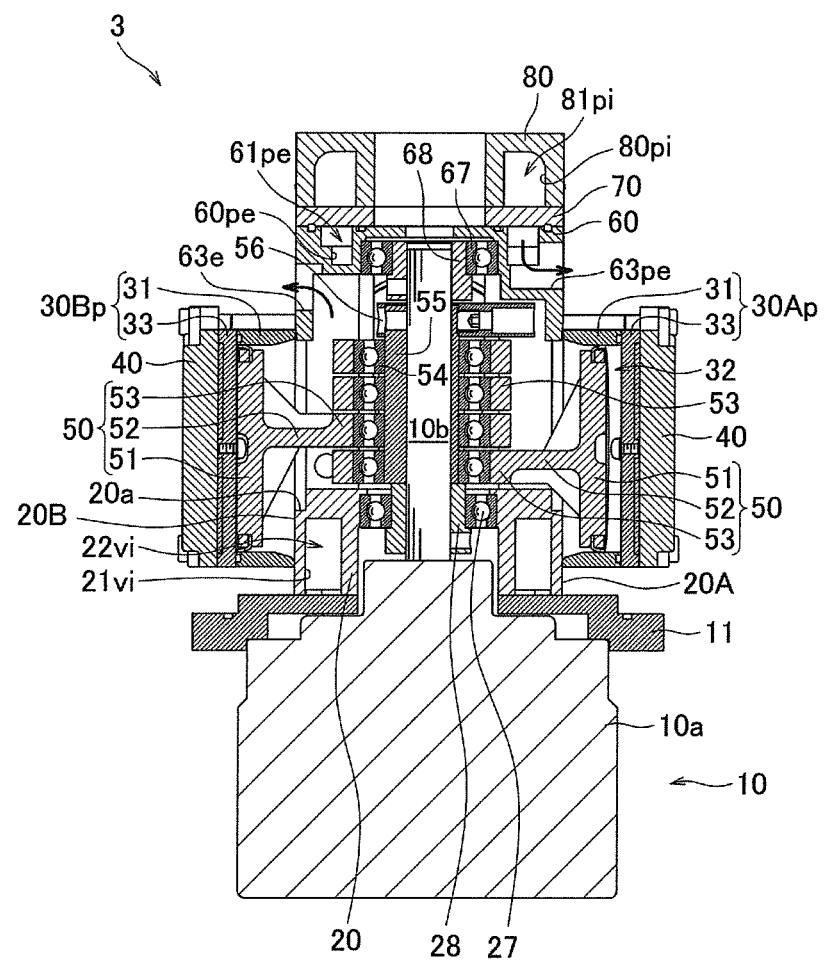
FIG. 8 is a cross sectional view taken along a line D-D in FIG. 6.

As shown in FIG. 7, FIG. 8, and the like, each of the four pistons 50 is constructed with a piston body 51, a piston rod 52, and a ring unit 53. The ring units 53 of the four pistons 50 are attached to an eccentric shaft 55 while vertically arrayed. The piston bodies 51 of the four pistons 50 are disposed in the decompressing cylinder 30Cv, the decompressing cylinder 30Dv, the compressing cylinder 30Bp, and the compressing cylinder 30Ap in the descending order of the direction in which the ring units 53 are arrayed. The eccentric shaft 55 is fitted in a balance weight 56 having an eccentric ring shape at the position above the uppermost ring unit 53.

Figure 16:
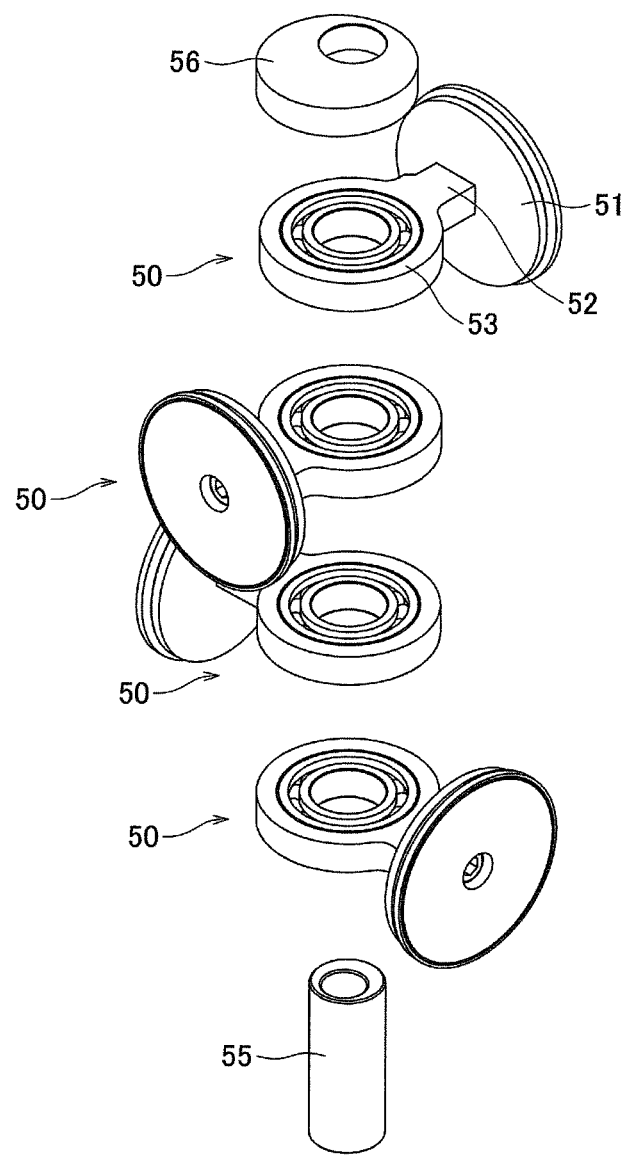
FIG. 16 is a perspective view showing an arrangement of four pistons.

As shown in FIG. 3 and FIG. 16, the piston body 51 having a disc shape is slidably disposed in the cylinder tube 31 in the tubular axis direction. The piston rod 52 joins the ring unit 53 and the piston body 51, and is disposed so as to pass through the notch 20*a* formed in the casing 20 as shown in FIG. 7 and the like. The eccentric shaft 55 is relatively rotatably fitted in the inner circumferential surface of the ring unit 53 with a bearing 54 interposed therebetween. The motor shaft 10*b* is fitted in the eccentric shaft 55 while being integrally rotatable along with the eccentric shaft 55. Therefore, when the motor shaft 10*b* rotates, the eccentric shaft 55 rotates eccentrically (rotates about an axis deviated from the shaft center of the motor shaft 10*b*), and therefore the ring unit 53 is oscillated to reciprocate the piston body 51 along the tubular axis direction of the cylinder tube 31.

The two decompressing pistons 50 are reciprocated in phases that are offset 180 degrees from each other, because the piston bodies 51 are disposed so as to oppose each other while the ring units 53 are mounted on the common eccentric shaft 55. Similarly the two compressing pistons 50 are reciprocated in the phases that are offset 180 degrees from each other. The decompressing piston 50 and the compressing piston 50 are reciprocated in the phases that are offset 90 degrees or 270 degrees from each other.

(First Casing Head)

Figure 2:
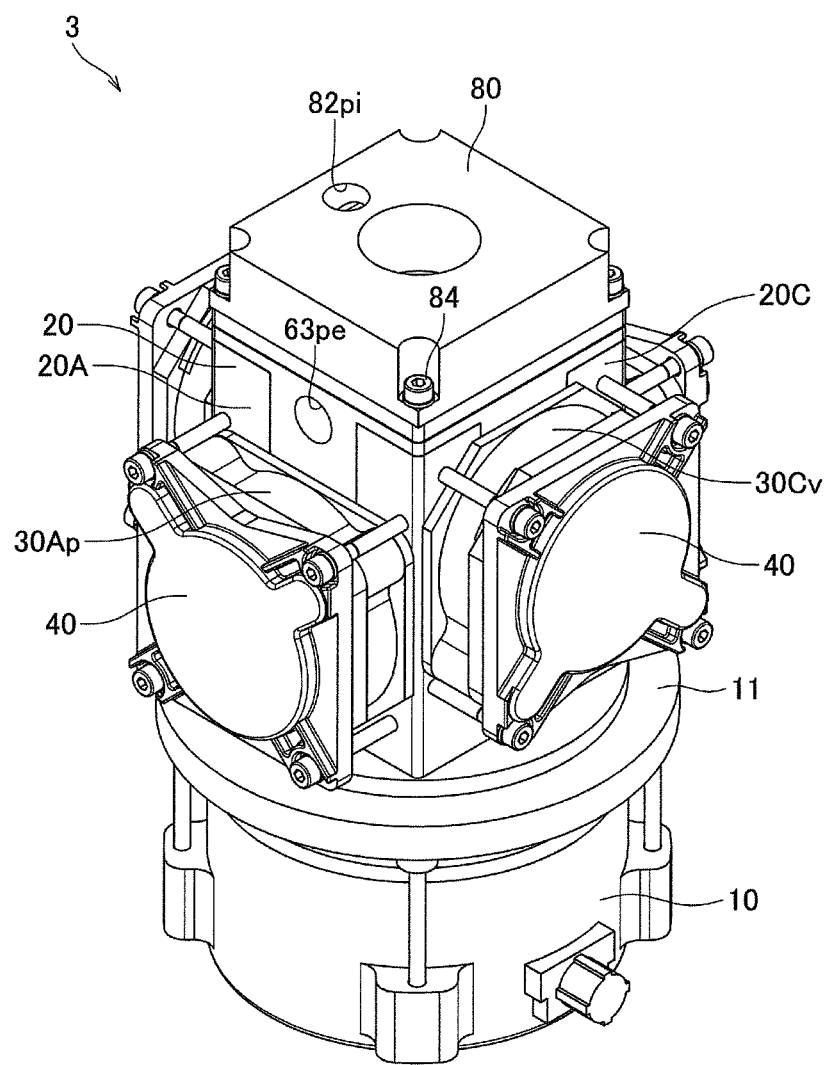
FIG. 2 is a perspective view of a reciprocating pump.

As shown in FIG. 2 and the like, the first casing head 60 is placed on the casing 20. As shown in FIG. 3 and the like, an outer shape of the first casing head 60 is formed in a square shape having the same dimension as the casing 20 in the vertical view, and a through hole is formed at the center of the first casing head 60. The lower end of the first casing head 60 is formed so as to be fitted in the four notches 20*a* of the casing 20. As shown in FIG. 9 and the like, bolts 84 pierce the four corner portions of the first casing head 60 in the vertical view in order to fix the second casing head 80 to the casing 20.

A substantially annular groove 60pe is formed in the upper surface of the first casing head 60. The groove 60pe has a substantially square outer circumference, and a circular inner circumference. The groove 60pe and the partition plate 70 constitute a compressing integrated exhaust duct 61pe. As shown in FIG. 7 and the like, in the groove 60pe, the inner circumferential side portion is deeper than the outer circumferential side portion. A bearing 66 is fitted in the inner circumferential wall portion of the groove 60pe, and the first casing head rotatably supports the upper end of the motor shaft 10b while the bearing 66 and a tubular axis 67 are interposed therebetween.

Figure 17A:
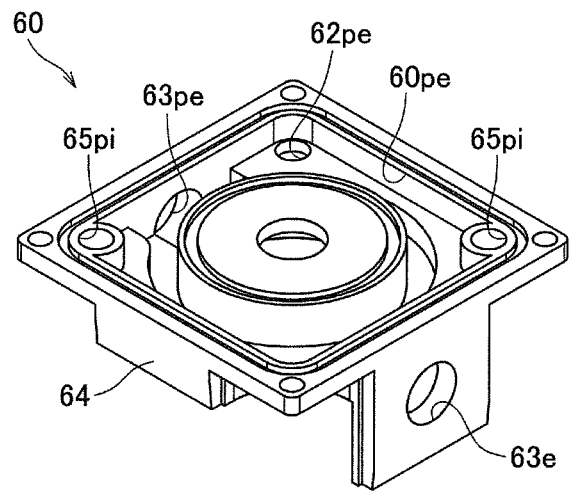
FIG. 17(a) is a perspective view showing a top surface of a first casing head.
Figure 17B:
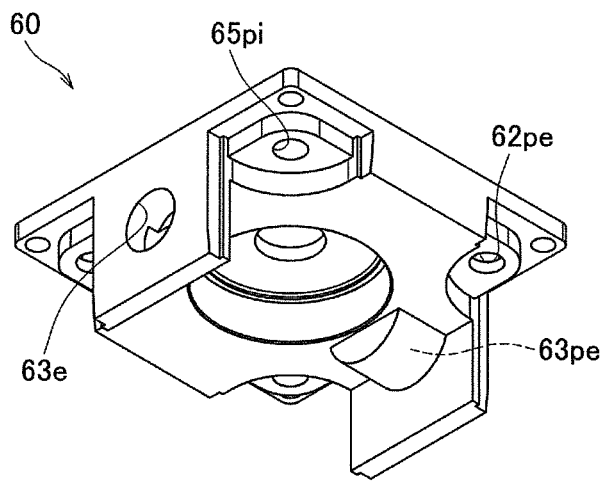
FIG. 17(b) is a perspective view showing a rear surface of the first casing head.

As shown in FIG. 10 and FIG. 17, two communication holes 62pe are formed at a bottom portion of the groove 60pe. The two communication holes 62pe are formed in the corner portions on the diagonal line of the first casing head 60 in the vertical direction. The lower ends of the communication holes 62pe are connected to the compressing exhaust ducts 26pe formed in the casing 20, respectively.

As shown in FIG. 3 and FIG. 9, two compressing intake ducts 65pi are formed outside the groove 60pe of the first casing head 60. The two compressing intake ducts 65pi are formed in the corner portions in which the communication holes 62pe are not formed on the diagonal line. The lower ends of the compressing intake ducts 65pi are connected to the compressing intake ducts 26pi formed in the casing 20, respectively.

As shown in FIG. 3 and FIG. 8, the compressing exhaust port 63pe communicating with the compressing integrated exhaust duct 61pe (the groove 60pe) is formed on the side surface of the first casing head 60. As shown in FIG. 8 and FIG. 17, the cooling exhaust port 63e is formed on the side surface opposed to the surface in which the compressing exhaust port 63pe is formed. The cooling exhaust port 63e is an opening portion that communicates the inside of the casing 20 with the outside.

(Partition Plate)

As shown in FIG. 2, FIG. 3, and the like, the partition plate 70 is a square plate member having the through hole in the center thereof, and is placed on the first casing head 60. As shown in FIG. 7 and the like, the partition plate 70 separates between the compressing integrated exhaust duct 61pe and a compressing integrated intake duct 81pi. The bolts 84 pierce the four corner portions of the partition plate 70 in order to fix the second casing head 80 to the casing 20. Two communication holes 70pi are made in the corner portions (particularly, the positions closer to the center with respect to the bolts 84) on the diagonal line of the partition plate 70. As shown in FIG. 9, the lower ends of the communication holes 70pi are connected to the compressing intake ducts 65pi formed in the first casing head 60, respectively.

(Second Casing Head)

As shown in FIG. 2 and the like, the second casing head 80 is placed on the partition plate 70. As shown in FIG. 3 and the like, the outer shape of the second casing head 80 is formed in the square shape having the same dimension as the casing 20 in the vertical view, and the through hole is formed at the center of the second casing head 80. As shown in FIG. 9 and the like, the second casing head 80 is fixed to the upper end of the casing 20 by the four bolts 84.

Figure 18A:
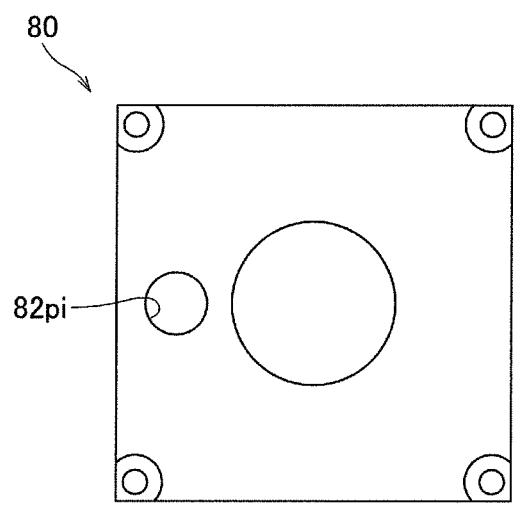
FIG. 18(a) is a plan view of a second casing head.
Figure 18B:
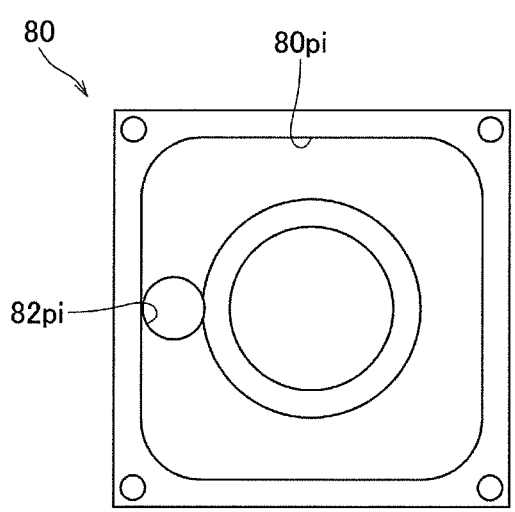
FIG. 18(b) is a rear view of the second casing head.

As shown in FIG. 18, a substantially annular groove 80pi is formed in the lower surface of the second casing head 80. As shown in FIG. 7 and the like, the groove 80pi and the partition plate 70 constitute the compressing integrated intake duct 81pi As shown in FIG. 9, the groove 80pi is formed in the region including the two communication holes 70pi of the partition plate 70 in the vertical view. Therefore, the compressing integrated intake duct 81pi communicates with the two compressing intake ducts 26pi of the casing 20 through the two communication holes 70pi and the two compressing intake ducts 65pi. As shown in FIG. 3, FIG. 7, and the like, the compressing intake port 82pi connected to the groove 80pi (the compressing integrated intake duct 81pi) is formed in the upper surface of the second casing head 80.

The following is a summary of the duct through which the air is introduced to the compressing cylinders 30Ap and 30Bp. As shown in FIG. 9, the compressing integrated intake duct 81pi communicates with the two compressing intake ducts (second duct) 26pi through the communication holes 70pi and the compressing intake ducts 65pi. As shown in FIG. 12, the two compressing intake ducts 26pi communicate with the intake chambers 41i of the cylinder heads 40 through the two compressing intake ducts (first duct) 25pi and the intake ducts 31i and the communication holes 34i of the compressing cylinders 30Ap and 30Bp, and the intake chambers 41i communicate with the cylinder chambers 32 of the compressing cylinders 30Ap and 30Bp through the intake ports 35i.

The following is a summary of the duct through which the air is discharged from the compressing cylinders 30Ap and 30Bp. As shown in FIG. 12, each of the cylinder chambers 32 of the compressing cylinders 30Ap and 30Bp communicates with the exhaust chamber 41e through the exhaust port 35e, and the two exhaust chambers 41e communicate with the two compressing exhaust ducts (first duct) 25pe through the communication holes 34e and the exhaust ducts 31e of the compressing cylinders 30Ap and 30Bp. As shown in FIG. 10, the two compressing exhaust ducts 26pe communicate with the compressing integrated exhaust duct 61pe through the compressing exhaust ducts (the second duct) 26pe and the communication holes 62pe.

The following is a summary of the duct through which the air is introduced to the decompressing cylinders 30Cv and 30Dv. As shown in FIG. 9, the decompressing integrated intake duct 22vi communicates with the two decompressing intake ducts (the second duct) 26vi. As shown in FIG. 13, the two decompressing intake ducts 26vi communicate with the intake chambers 41i of the cylinder heads 40 through the decompressing intake ducts (the first duct) 25vi and the intake ducts 31i and the communication holes 34i of the decompressing cylinders 30Cv and 30Dv, and the two intake chambers 41i communicate with the cylinder chambers 32 of the decompressing cylinders 30Cv and 30Dv through the intake ports 35i.

The following is a summary of the duct through which the air is discharged from the decompressing cylinders 30Cv and 30Dv is summarized as follows. As shown in FIG. 13, the cylinder chambers 32 of the decompressing cylinders 30Cv and 30Dv communicate with the exhaust chambers 41e through the exhaust ports 35e, and the two exhaust chambers 41e communicate with the two decompressing exhaust ducts 24ve through the communication holes 34e and the exhaust ducts 31e of the decompressing cylinders 30Cv and 30Dv.

Next, the following describes an operation of the reciprocating pump 3. The four piston bodies 51 are reciprocated in the cylinder tube 31 by the rotation of the motor shaft 10b. It is assumed that the motor shaft 10b rotates clockwise when viewed from above. In FIG. 11, the piston body 51 in the compressing cylinder 30Ap indicates a final state (bottom dead center) of an intake stroke, the piston body 51 in the compressing cylinder 30Bp indicates a final state (top dead center) of an exhaust stroke, the piston body 51 of the decompressing cylinder 30Cv indicates a halfway state of the exhaust stroke, and the piston body 51 of the decompressing cylinder 30Dv indicates a halfway state of the intake stroke.

In the intake strokes of the compressing cylinders 30Ap and 30Bp, when the piston body 51 in the compressing cylinder retreats from the top dead center, the cylinder chamber 32 becomes the negative pressure to put the intake valve (not shown) into the opened state, and the air is sucked into the cylinder chamber 32 from the intake chamber 41i through the intake port 35i. Therefore, the atmospheric air is sucked through the air inlet port 2a, flows in the compressing integrated intake duct 81pi through the compressing intake port 82pi, and flows in the intake chamber 41i through the communication hole 70pi, the compressing intake duct 65pi, the compressing intake duct 26pi, the compressing intake duct 25pi, the intake duct 31i, and the communication hole 34i.

In the exhaust strokes of the compressing cylinders 30Ap and 30Bp, when the piston body 51 in the compressing cylinder proceeds from the bottom dead center to compress the air in the cylinder chamber 32, the exhaust valve 36 becomes the opened state, and the compressed air in the cylinder chamber 32 is discharged to the exhaust chamber 41e through the exhaust port 35e. The compressed air discharged to the exhaust chamber 41e is discharged to the compressing integrated exhaust duct 61pe through the communication hole 34e, the exhaust duct 31e, the compressing exhaust duct 25pe, the compressing exhaust duct 26pe, and the communication hole 62pe, discharged through the compressing exhaust port 63pe, and supplied to the adsorption vessels 5a and 5b.

The piston bodies 51 of the compressing cylinders 30Ap and 30Bp repeat the intake stroke and the exhaust stroke in the phases that are offset 180 degrees from each other. Therefore, the compressed air is continuously discharged from the reciprocating pump 3.

In the intake strokes of the decompressing cylinders 30Cv and 30Dv, when the piston body 51 in the decompressing cylinder retreats from the top dead center to put the cylinder chamber 32 in the negative pressure, the intake valve (not shown) becomes the opened state, and the air is sucked into cylinder chamber 32 from the intake chamber 41i through the intake port 35i. Therefore, the air (the nitrogen containing gas) in the adsorption vessels 5a and 5b is sucked to flow in the decompressing integrated intake duct 22vi through the decompressing intake port 23vi, and flows in the intake chamber 41i through the decompressing intake duct 26vi, the decompressing intake duct 25vi, the intake duct 31i, and the communication hole 34i.

In the exhaust strokes of the decompressing cylinders 30Cv and 30Dv, when the piston body 51 in the decompressing cylinder proceeds from the bottom dead center to compress the air in the cylinder chamber 32, the exhaust valve 36 becomes the opened state, and the air in the cylinder chamber 32 is discharged to the exhaust chamber 41e through the exhaust port 35e. The air discharged to the exhaust chamber 41e is discharged to the inside of the casing 20 through the communication hole 34e, the exhaust duct 31e, and the decompressing exhaust duct 24ve.

The piston bodies 51 of the decompressing cylinders 30Cv and 30Dv repeat the intake stroke and the exhaust stroke in the phases that are offset 180 degrees from each other. Therefore, the air in the adsorption vessels 5a and 5b is continuously sucked by the reciprocating pump 3.

The air discharged to the inside of the casing 20 from the decompressing exhaust duct 24ve passes through the inside of the casing 20, and is discharged through the cooling exhaust port 63e of the first casing head 60. A slide portion, the piston 50, and the casing 20 and the like are cooled by the air passing through the inside of the casing 20, which allows a temperature in the casing 20 to be restrained from rising due to friction heat or compression heat. This prevents thermal strain or degradation of the bearing or a seal member and the like. Further, it is possible to restrain the temperature rise of the air passing through the compressing intake ducts 25pi and 26pi, which consequently enable improvement of the compression efficiency. Further, it is possible to prevent the temperature rise of the air passing through the compressing exhaust ducts 25pe and 26pe (or to cool the air), and therefore it is possible to prevent a decrease in the oxygen concentration of the oxygen concentrated gas. This is because, in the adsorbent such as zeolite, adsorption efficiency increases with a decrease in the temperature of the supplied air.

In the reciprocating pump 3 of the embodiment, the eight ducts including the two ducts 24pi, the two ducts 24pe, the two ducts 24vi, and the two ducts 24ve are disposed in the region surrounded by the four cylinders 30 in the vertical view. The restrains the enlargement of the reciprocating pump 3. It is also possible to restrain the enlargement of the oxygen concentrator 1. Each two of the eight ducts are disposed between the cylinders 30 adjacent to each other about the motor shaft, so that the space surrounded by the four cylinders 30 is effectively used to efficiently dispose the duct. The two ducts disposed between the cylinders adjacent to each other are vertically arrayed, so that the two ducts are compactly disposed when viewed from the motor shaft direction.

Because the eight ducts are formed in the casing 20, the duct is efficiently disposed compared with a case where a member such as a pipe and the like is used as the duct. Thus, it is possible to reliably restrain the enlargement.

In the reciprocating pump 3 of the embodiment, the ducts are integrated in the region surrounded by the four cylinders 30 in the vertical view. The ducts are therefore efficiently integrated.

The two integrated ducts 61pe and 81pi are vertically arrayed, so that the two integrated ducts can compactly be disposed.

Because the integrated ducts 22vi and 61pe are formed into the cyclic shape concentric with the motor shaft 10b, the integrated ducts 22vi and 61pe do not interfere with the motor shaft 10b.

Maximum loads are applied to the pistons 50 disposed in the compressing cylinders 30Ap and 30Bp in the exhaust stroke. In the embodiment, the two compressing pistons 50 are reciprocated in the phases that are offset 180 degrees from each other, so that times at which the maximum loads are applied to the two pistons 50 (that is, times when a load torque of the motor shaft 10b is increased by the compressing pistons 50) are made different from each other in a balanced manner.

The maximum loads are applied to the pistons 50 disposed in the decompressing cylinders 30Cv and 30Dv in the intake stroke. In the embodiment, the two decompressing pistons 50 are reciprocated in the phases that are offset 180 degrees from each other, so that the times at which the maximum loads are applied to the two decompressing pistons 50 (that is, the time when the load torque of the motor shaft 10b is increased by the decompressing pistons 50) are made different from each other in a balanced manner.

The pistons 50 disposed in the compressing cylinders 30Ap and 30Bp and the pistons 50 disposed in the decompressing cylinders 30Cp and 30Dp are reciprocated in the phases that are offset 90 degrees or 270 degrees from each other, so that the time at which the load torque of the motor shaft 10b is increased by the compressing pistons 50 and the time at which the load torque of the motor shaft 10b is increased by the decompressing pistons 50 are made different from each other. Therefore, it is possible to restrain a load change of the motor shaft.

Because the two compressing cylinders 30Ap and 30Bp are disposed to oppose each other, forces applied to the motor shaft 10b from the two compressing pistons 50 in the direction perpendicular to the motor shaft 10b have the same magnitude and the directions opposite to each other. Because the two decompressing cylinders 30Cv and 30Dv are also disposed to oppose each other, forces applied to the motor shaft 10b from the two compressing pistons 50 in the direction perpendicular to the motor shaft 10b have the same magnitude and the directions opposite to each other. This enables application of the force to the motor shaft in a balanced manner. As a result, a torque change is restrained, and efficiency improvement and vibration restraint are possible.

In the reciprocating pump 3 of the embodiment, the decompressing exhaust ducts 24ve formed in the casing 20 is communicated with the inside of the casing 20, and the air discharged from the decompressing cylinders 30Cv and 30Dv is used to cool the motor shaft 10b and the like. Therefore, it is not necessary to separately provide a cooling device.

Although the embodiment of the present invention is described above the specific configuration of the present invention is not limited to the embodiment. The scope of the present invention is indicated not only the description of the embodiment but also claims, and the meanings equivalent to the claims all the changes in the scope are also included in the present invention. The following modifications may be implemented by a proper combination thereof.

Figure 20:
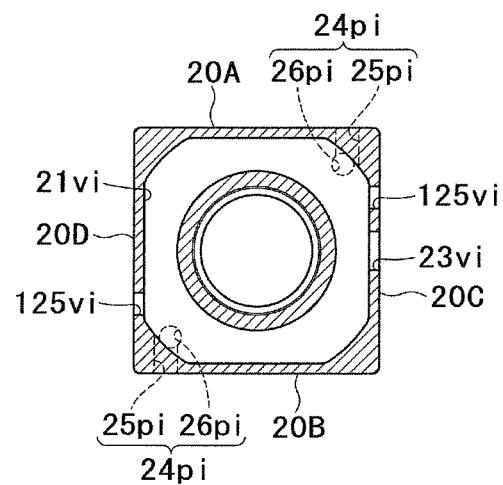
FIG. 20 is a rear view showing a casing of a reciprocating pump according to another embodiment of the present invention.

In the embodiment, the two ducts disposed between the cylinders 30 adjacent to each other about the motor shaft are formed in the overlapping region when viewed in the motor shaft direction. Alternatively, as long as the two ducts are arrayed in the motor shaft direction, the ducts may be formed in the regions that do not overlap each other when viewed in the motor shaft direction. For example, as shown in FIG. 20, two ducts 125vi are directly connected to the decompressing integrated intake duct 22vi without providing the duct 26vi, and the duct 125vi may be formed such that the duct 125vi does not overlap the duct 24pi when viewed in the motor shaft direction.

Figure 21:
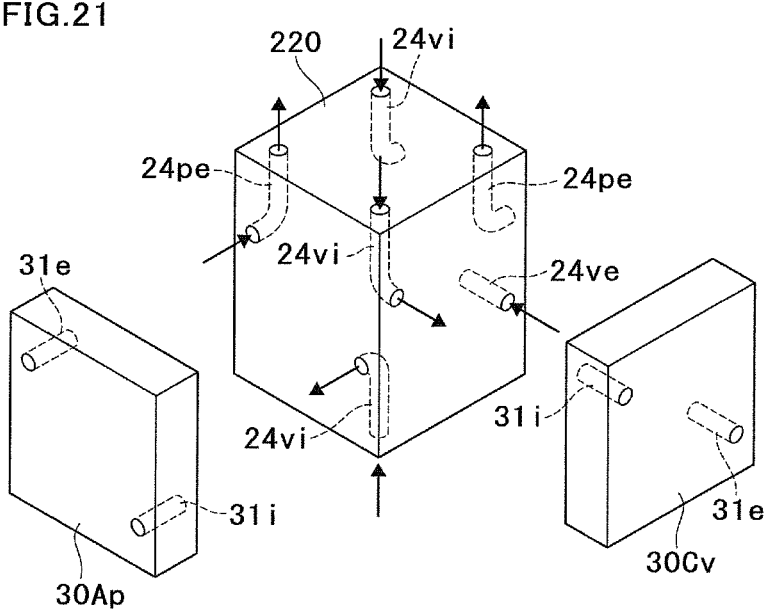
FIG. 21 is a schematic perspective view showing a duct of the reciprocating pump according to another embodiment of the present invention.

In the embodiment, the decompressing ducts 24vi and 24ve are disposed below the compressing ducts 24pi and 24pe. Alternately, for example, the compressing intake duct 24pi may be disposed below the decompressing intake duct 24vi like a casing 220 in FIG. 21.

In the embodiment, both the two ducts vertically arrayed are used in the intake or the exhaust. Alternatively, the intake duct and the exhaust duct may vertically be arrayed.

In the embodiment, the two ducts communicating with the two different cylinders 30 are vertically arrayed. Alternatively, for example, the intake duct and the exhaust duct, which are connected to the one cylinder 30, may vertically be arrayed like a casing 320 in FIG. 22.

The second duct may not necessarily be formed in the casing 20. For example, the second duct may be disposed inside the casing 20 using the member such as the pipe.

In the embodiment, the duct 24ve used to discharge the air from the decompressing cylinders 30Cv and 30Dv communicates with the inside of the casing 20 for the purpose of the cooling. However, the duct 24ve is not limited to the configuration of the embodiment. Similarly to the other ducts, the second duct is provided, and the air discharged from the decompressing cylinders 30Cv and 30Dv may be discharged to the outside of the casing 20 without passing through the inside of the casing 20. In this case, the integrated duct that integrates the two decompressing exhaust ducts is provided below the casing 20.

The integrated duct is not limited to the cyclic duct. For example, the integrated duct may be formed into a semi-cyclic (arc) shape.

Figure 22:
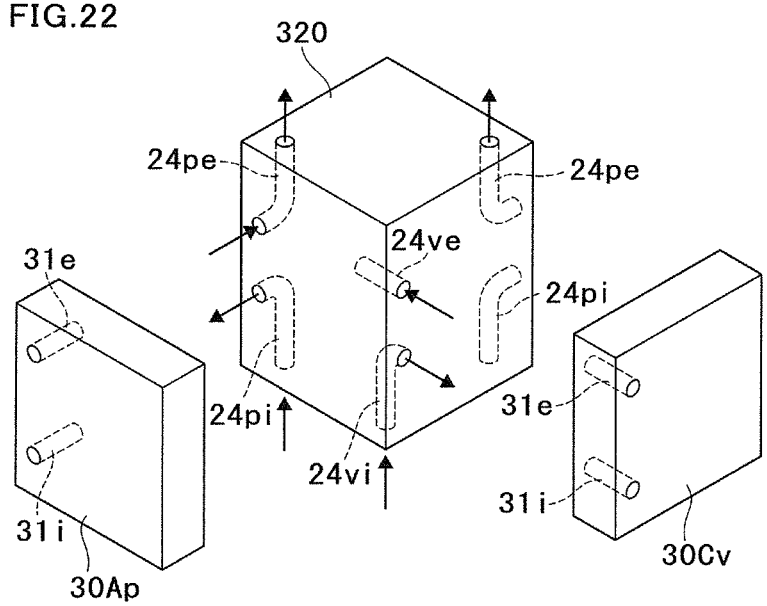
FIG. 22 is a schematic perspective view showing a duct of the reciprocating pump according to another embodiment of the present invention.

In the embodiment, the two integrated ducts are provided above the casing 20 while the one integrated duct is provided below the casing 20. Alternatively, for example, in the case that the eight ducts are disposed as shown in FIG. 22, the one integrated duct may be provided above the casing 20 while the two integrated ducts are provided below the casing 20.

In the embodiment, the integrated duct is attached to the casing 20 or formed in the casing 20, and the integrated duct is disposed in the region surrounded by the four cylinders 30 when viewed in the vertical direction. Alternatively, for example, the member such as the pipe is connected to the second duct formed in the casing 20, and the member such as the pipe may be integrated by the integrated duct constructed by a pipe joint and the like.

Figure 23A:
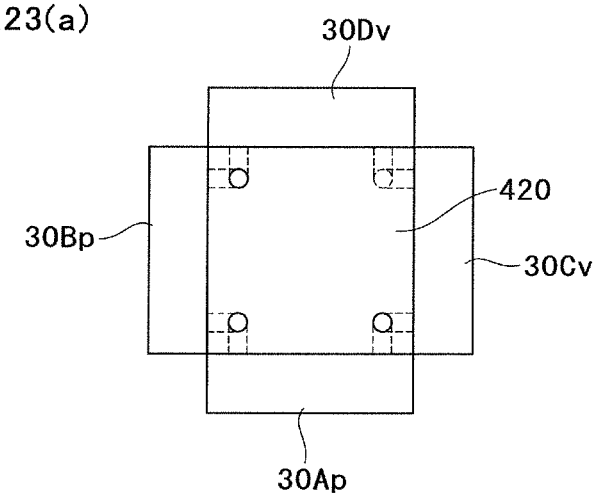
FIG. 23(a) is a schematic plan view showing an arrangement of four cylinders according to another embodiment of the present invention.
Figure 23B:
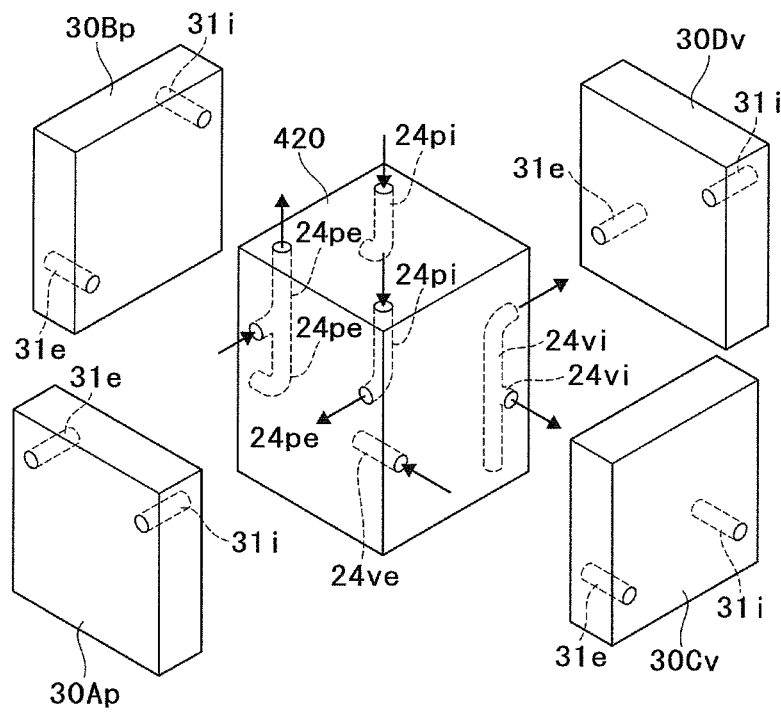
FIG. 23(b) is a schematic perspective view showing a duct of a reciprocating pump in FIG. 23(a).

In the embodiment, both the two compressing cylinders 30Ap and 30Bp and the two decompressing cylinders 30Cv and 30Dv are dispose to oppose each other. Alternatively, the two compressing cylinders 30Ap and 30Bp and the two decompressing cylinders 30Cv and 30Dv may be disposed at positions that are offset 90 degrees from each other as shown in FIG. 23(a). In this case, the two compressing piston bodies 51 are reciprocated in the phases that are offset 90 degrees from each other, and the two decompressing piston bodies 51 are also reciprocated in the phases that are offset 90 degrees from each other. In the case that the cylinders 30 applied in the same uses are disposed at the positions that are offset 90 degrees from each other, for example, the two second ducts communicating with the two cylinders applied in the same uses may be connected while vertically arrayed like a casing 420 in FIG. 23(b). In FIG. 23(b), the second ducts of the two compressing exhaust ducts 24pe are connected to each other, and the second ducts of the two decompressing intake ducts 24vi are connected to each other. Thus, the two ducts are integrated with a simple configuration by connecting the two second ducts to each other, and there is no need for providing the integrated duct.

Figure 24:
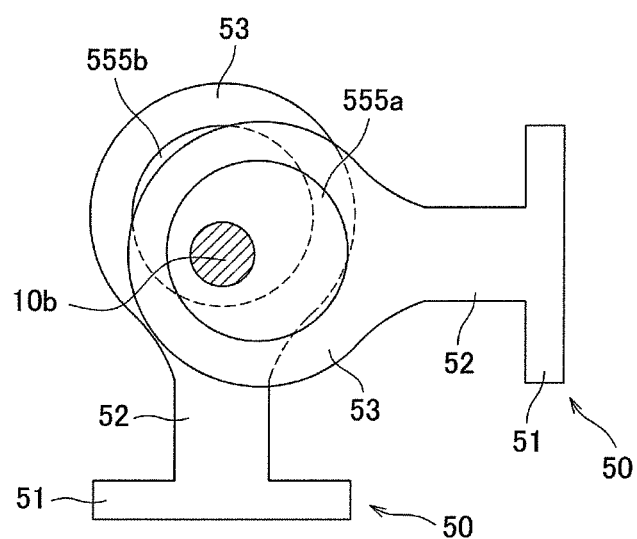
FIG. 24 is a schematic cross sectional view showing a surrounding of a motor shaft of a reciprocating pump according to another embodiment of the present invention.

In the embodiment, the ring units 53 of the four pistons 50 are mounted on the one eccentric shaft 55. Alternatively, the ring units 53 may be mounted on the separate eccentric shafts. Therefore, as shown in FIG. 24, it is possible to deviate a center position of an outer circumferential surface of an eccentric shaft 555a from a center position of an outer circumferential surface of an eccentric shaft 555b. This allows freedom in adjusting the phases of the four piston bodies 51. The two compressing pistons 50 may be joined to one of the eccentric shafts while the two decompressing piston 50 are joined to the other eccentric shaft.

In the embodiment, the compressing cylinder and the piston and the decompressing cylinder and the piston have the same configuration. Alternatively, the compressing cylinder and the piston and the decompressing cylinder and the piston may have the different configurations. For example, an inner diameter (a diameter of the piston body) of the compressing cylinder may differ from an inner diameter of the decompressing cylinder. The compressing piston body may differ from the decompressing piston body in a speed by attaching the compressing piston and the decompressing piston to the eccentric shafts having different outer diameters.

In the embodiment, two of the four cylinders 30 are used in the compression, and the remaining two cylinders 30 are used in the decompression. Alternatively, three of the four cylinders 30 may be used in the compression while the remaining one is used in the decompression. The opposite way may also hold. In this case, the ducts connected to the three compressing or decompressing cylinders 30 are integrated by the integrated duct.

Figure 25:
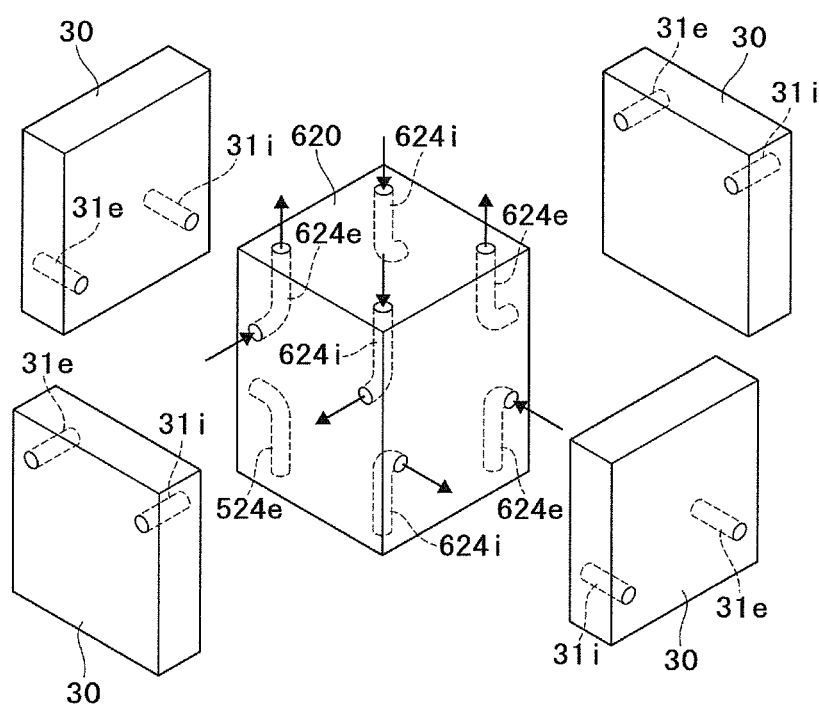
FIG. 25 is a schematic perspective view showing a duct of a reciprocating pump according to another embodiment of the present invention.

The four cylinders may be used in the compression at two kinds of pressure levels. That is, in the four compressing cylinders, the pressure levels of the two or three cylinders are equal to one another, and are different from the pressure level of the remaining cylinder. This reciprocating pump acts as two kinds of compressing pumps that discharge the compressed air with different pressures. In this case, for example, all the eight ducts (four intake ducts 624i and four exhaust ducts 624e) include the second ducts like a casing 620 in FIG. 25. In this modification, because the ducts communicating the plural cylinders having the same pressure level are integrated by the integrated duct, the number of integrated ducts becomes four, and each two of the four integrated ducts are vertically provided in the casing 620. The reciprocating pump of the modification is applied to a Pressure Swing Adsorption (PSA) system oxygen concentrator. In the oxygen concentrator adopting a PSA system, the compressed air is supplied into the adsorption vessel in the nitrogen adsorption process, and the adsorption vessel is opened to the atmospheric pressure to desorb the nitrogen from the adsorbent in the nitrogen desorption process.

The four cylinders may be used in the decompression at two kinds of pressure levels. The reciprocating pump acts as two kinds of decompressing pumps having the different suction forces. In the case that the exhaust air is used to cool the inside of the casing 20, only the four ducts of the eight ducts have the second ducts, and the number of integrated ducts becomes two. The reciprocating pump of the modification is applied to a Vacuum Swing Adsorption (VSA) system oxygen concentrator. In the oxygen concentrator adopting a VSA system, the adsorption vessel is put into the negative pressure before the nitrogen adsorption process (in the nitrogen desorption process), and the adsorption vessel is opened to the substantially atmospheric pressure to adsorb the nitrogen to the adsorbent in the nitrogen adsorption process.

In the embodiment, the reciprocating pump of the present invention is applied to the oxygen concentrator by way of example. However, the reciprocating pump of the present invention is not limited to the oxygen concentrator. The integrated duct may not be provided depending on an application target of the reciprocating pump.

INDUSTRIAL APPLICABILITY

The present invention can restrain the enlargement of the reciprocating pump

What is claimed is:
1. A reciprocating pump comprising:
a motor including a motor shaft;
four cylinders disposed at positions offset 90 degrees from each other about the motor shaft, the cylinders having cylinder shaft directions perpendicular to a motor shaft direction;
four pistons disposed in the cylinders, respectively, the pistons being configured to be reciprocated by the motor shaft;
a casing accommodating the motor shaft; and
eight ducts including four intake ducts and four exhaust ducts, gas being introduced into the four cylinders through the four intake ducts and gas being discharged from the four cylinders through the four exhaust ducts, and the eight ducts being disposed in a region surrounded by the four cylinders when viewed along the motor shaft direction,
the eight ducts being arranged in four pairs with each pair of two of the eight ducts being disposed between the cylinders adjacent to each other about the motor shaft,
the four pairs of two ducts disposed between the cylinders adjacent to each other about the motor shaft extending along the motor shaft direction,
each of the eight ducts including a first duct that extends onto a side of the motor shaft from an outside of the region surrounded by the four cylinders when viewed along the motor shaft direction, and
each of at least four ducts of the eight ducts including a second duct extending along the motor shaft direction.

2. The reciprocating puny according to claim 1, wherein the first ducts and the second ducts are formed in the casing.

3. The reciprocating pump according to claim 1, further comprising
two integrated ducts disposed in the region surrounded by the four cylinders when viewed along the motor shaft direction, the integrated ducts integrating the ducts communicating with the cylinders.

4. The reciprocating pump according to claim 3, wherein the two integrated ducts extend along the motor shaft direction.

5. The reciprocating pump according to claim 3, wherein each of the integrated ducts is formed into an annular shape concentric with the motor shaft.

6. The reciprocating pump according to claim 1, wherein at least one cylinder out of the four cylinders is used in compression, and a remainder of the four cylinders is used in decompression.

7. The reciprocating pump according to claim 1, wherein all the four cylinders are used in compression or decompression, and
two or three cylinders of the four cylinders are equal to one another in pressure level, and are different from a remainder of the four cylinders in pressure level.

8. The reciprocating pump according to claim 1, wherein two of the four cylinders are used in compression or decompression at an equal pressure level, and
two of the four pistons disposed in the two cylinders are reciprocated in phases that are offset 180 degrees from each other.

9. The reciprocating pump according to claim 1, wherein two of the four cylinders are disposed to oppose each other and are used in compression or decompression at an equal pressure level.

10. The reciprocating pump according to claim 1, wherein a first duct of the exhaust ducts connected to a decompressing cylinder communicates with an inside of the casing.

11. The reciprocating pump according to claim 1, wherein the two second ducts communicating with the two cylinders disposed in positions offset 90 degrees from each other are connected to each other while extending along the motor shaft direction.

12. An oxygen concentrator including the reciprocating pump according to claim 1, the oxygen concentrator further comprising:
an adsorption unit with an adsorbent enclosed therein, the adsorbent being configured to absorb and desorb nitrogen according to a pressure, the adsorption unit being configured to generate an oxygen concentrated gas by adsorbing the nitrogen in supplied air to the adsorbent, the reciprocating pump being configured to perform at least one of supply of compressed air to the adsorption unit and decompression in the adsorption unit.

* * * * *